United States Patent
Baldo et al.

(10) Patent No.: US 12,086,405 B1
(45) Date of Patent: Sep. 10, 2024

(54) SYSTEMS AND METHODS FOR DECISION PROCESS TRACING FOR MEASURING CONFLICT

(71) Applicant: Ipsos America, Inc., Norwalk, CT (US)

(72) Inventors: Davide Baldo, Paris (FR); Richard John Timpone, Columbus, OH (US)

(73) Assignee: Ipsos America, Inc., Norwalk, CT (US)

( * ) Notice: Subject to any disclaimer, the term of this patent is extended or adjusted under 35 U.S.C. 154(b) by 0 days.

(21) Appl. No.: 18/342,362

(22) Filed: Jun. 27, 2023

Related U.S. Application Data

(60) Provisional application No. 63/493,463, filed on Mar. 31, 2023.

(51) Int. Cl.
 *G06F 3/0486* (2013.01)
 *G06F 3/04883* (2022.01)

(52) U.S. Cl.
 CPC ........ *G06F 3/04883* (2013.01); *G06F 3/0486* (2013.01)

(58) Field of Classification Search
 CPC .... G06F 3/0488; G06F 3/0486; G06F 3/0487; G06F 3/0484; G06F 3/048
 See application file for complete search history.

(56) References Cited

U.S. PATENT DOCUMENTS

| | | | | |
|---|---|---|---|---|
| 2012/0284324 A1* | 11/2012 | Jarville | ............. | G06Q 30/0201 709/203 |
| 2015/0177964 A1* | 6/2015 | Spirer | ................ | G06F 16/4393 715/732 |
| 2018/0341919 A1* | 11/2018 | Luhman | ............ | G01C 21/3407 |

OTHER PUBLICATIONS

Yun Young Lee et al., Drag-and-Drop Refactoring: Intuitive and Efficient Program Transformation, May 1, 2013, IEEE Xplore, pp. 24-32 (Year: 2013).*

Won-Seok Yang et al., Effects of Visual Elements into the Touch Interaction During the Drag Operation, Aug. 1, 2014, International Conference on Advanced Applied Informatics, pp. 141-146 (Year: 2014).*

Freeman, Jonathan B., "Doing Psychological Science by Hand," Association for Psychological Science, SAGE Publications, 2018, 9 pages.

Hehman, Eric, et al., "Advanced mouse-tracking analytic techniques for enhancing psychological science," Group Processes & Intergroup Relations, SAGE Publications, vol. 18(3), 2014, pp. 384-401.

Timpone, Rich, et al., "Measuring Cognitive Conflict to Predict Attitude and Behavior Change," Ipsos, Neuromarketing World Forum (NMWF), Berlin, Sep. 28-30, 2022, 32 pages.

(Continued)

*Primary Examiner* — Tam T Tran
(74) *Attorney, Agent, or Firm* — McDermott Will & Emery LLP

(57) ABSTRACT

Methods and systems for input tracing on a mobile computing device, and specifically, input tracing of user provided touch input at a touchscreen display of a mobile computing device. The user input can be tracked to determine an actual path between a user interactable element and a graphical element. The actual path can be compared to a target path, and based on the deviation between the two, store data indicating a correlation between the user and an appropriate response associated with a graphical element (e.g., a degree of conviction/affinity between the user and the appropriate response associated with the graphical element).

20 Claims, 22 Drawing Sheets

(56) References Cited

OTHER PUBLICATIONS

Baldo, Davide, et al., "Online Mouse Tracking and Anticipated Regret for Measuring Cognitive Conflict to Better Predict People's Behavior: Practical Applications for the Marketing Research Industry," Ipsos, Association for NeuroPsychoEconomics (NPE), Jun. 7, 2022, 5 pages.

Stillman, Paul E., "How Mouse-tracking Can Advance Social Cognitive Theory," Trends in Cognitive Sciences, CellPress Reviews, vol. 22, No. 6, Jun. 2018, pp. 531-543.

Stillman, Paul E., "Resisting Temptation: Tracking How Self-Control Conflicts Are Successfully Resolved in Real Time," Association for Psychological Science, SAGE Publications, vol. 28(9), 2017, pp. 1240-1258.

Szaszi, Barnabas, et al., "Thinking dynamics and individual differences: Mouse-tracking analysis of the denominator neglect task," Journal of Judgment and Decision Making, vol. 13, No. 1, Jan. 2018, pp. 23-32.

\* cited by examiner

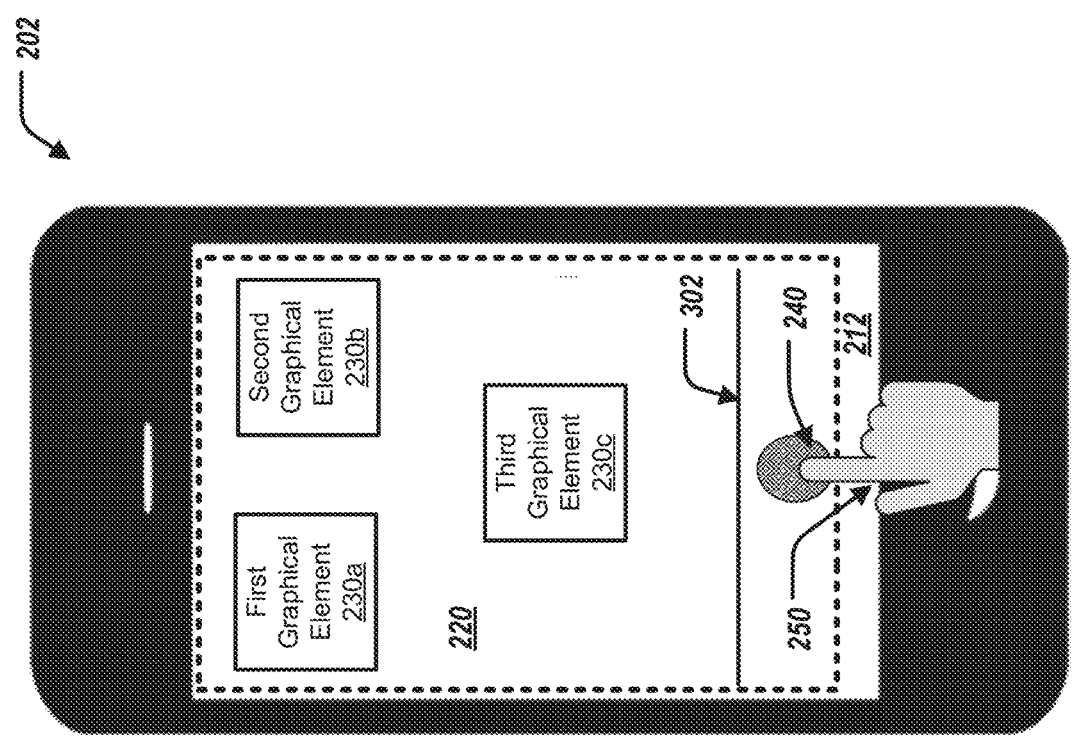

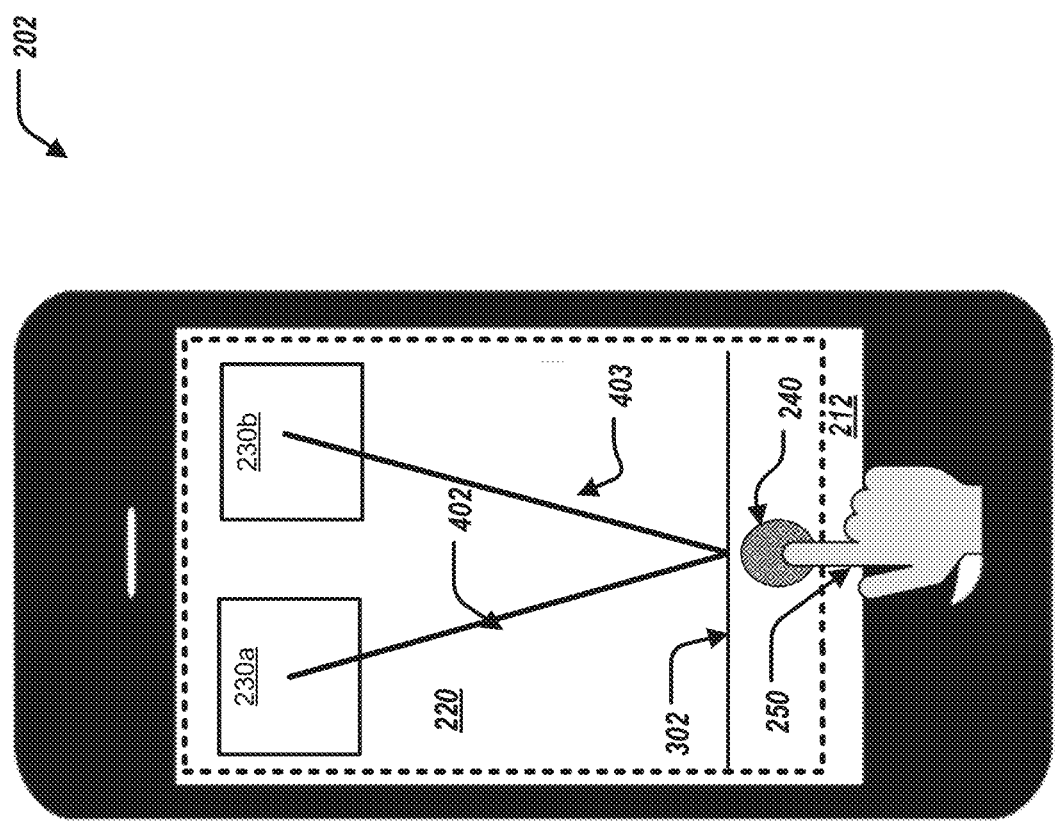

SYSTEMS AND METHODS FOR DECISION PROCESS TRACING FOR MEASURING CONFLICT

CROSS-REFERENCE TO RELATED APPLICATION

This application claims priority to U.S. Provisional Application No. 63/493,463, filed Mar. 31, 2023, which is incorporated herein by reference in its entirety.

BACKGROUND

Field of the Disclosure

The disclosure relates generally to systems and methods for decision process tracing for measuring conflict.

Description of the Related Art

As the value and use of information continues to increase, individuals and businesses seek additional ways to process and store information. One option available to users is computing devices. A computing device generally processes, compiles, stores, and/or communicates information or data for business, personal, or other purposes thereby allowing users to take advantage of the value of the information. Because technology and information handling needs and requirements vary between different users or applications, computing devices may also vary regarding what information is handled, how the information is handled, how much information is processed, stored, or communicated, and how quickly and efficiently the information may be processed, stored, or communicated. The variations in computing devices allow for computing devices to be general or configured for a specific user or specific use such as financial transaction processing, airline reservations, enterprise data storage, or global communications. In addition, computing devices may include a variety of hardware and software components that may be configured to process, store, and communicate information and may include one or more computer systems, data storage systems, and networking systems. Computing devices may be utilized by individuals and businesses to process and store information, but can be further utilized to give insight into how individuals make decisions, as discussed below.

SUMMARY

Innovative aspects of the subject matter described in this specification may be embodied in a method of performing input tracing, including providing, for display upon a touchscreen display of a mobile computing device, a first graphical element at a first position, a second graphical element at a second position, and a segmentation indicator, the first graphical element representing a first response and the second graphical element representing a second response; providing, for display upon the touchscreen display of the mobile computing device, a user interactable element at an initial position; providing, for display upon the touchscreen display of the mobile computing device, a third graphical element associated with the first response and/or the second response; determining a target path between a center of the segmentation indicator and the first position of the first graphical element, the target path representing a straight-line path; receiving touch-based user input from a user indicating a plurality of positions of the user interactable element with respect to the touchscreen display of the mobile computing device, including a final position of the user interactable element that coincides with the first position of the first graphical element; updating, in response to the touch-based user input, display of the user interactable element upon the touchscreen display of the mobile computing device based on the plurality of positions; tracking, based on the plurality of positions of the user interactable element with respect to the touchscreen display of the mobile computing device, an actual path of the user interactable element with respect to the first graphical element; calculating a maximum deviation of the actual path from the target path; comparing the maximum deviation to a threshold; and determining, based on the comparing, that the maximum deviation is greater than the threshold, and in response, storing data at a data store remote from the mobile computing device indicating a correlation between the user and the second response.

Other embodiments of these aspects include corresponding systems, apparatus, and computer programs, configured to perform the actions of the methods, encoded on computer storage devices.

These and other embodiments may each optionally include one or more of the following features. For instance, determining, based on the comparing, that the maximum deviation is less than the threshold, and in response, storing data at the data store indicating a correlation between the user and the first response. Tracking the actual path of the user interactable element with respect to the first graphical element further includes determining, for each position of the user-interactable element with respect to the touchscreen display of the mobile computing device, coordinates of the user interactable element with respect to the touchscreen display of the mobile computing device. Tracking the actual path of the user interactable element with respect to the first graphical element further includes calculating the actual path of the user interactable element with respect to the first graphical element based on the coordinates of the user-interactable element for each position of the user interactable element. Determining a time period between initial display of the third graphical element and the final position of the user interactable element; and storing data at the data store indicating the time period for the correlation between the user and the second response. Providing, for display upon the touchscreen display of the mobile computing device, the third graphical element further includes providing, for display upon the touchscreen display of the mobile computing device, the third graphical element equidistant between the first graphical element and the second graphical element. The first graphical element, the second graphical element, the third graphical element, the segmentation indicator, and the user interactable element are displayed upon the touchscreen display in a landscape orientation of the touchscreen display. The first graphical element, the second graphical element, the third graphical element, the segmentation indicator, and the user interactable element are displayed upon the touchscreen display in a portrait orientation of the touchscreen display. Adjusting a presentation of the first graphical element in response to the final position of the user interactable element coinciding with the first position of the first graphical element. Adjusting the presentation of the first graphical element further includes adjusting a border of the first graphical element. Providing, for display upon the touchscreen display of the mobile computing device, the user interactable element at the initial position further includes providing the user interactable element at the initial position and a first color, wherein updating display of the user interactable element upon the touchscreen display of the mobile computing device further includes updating the user interactable element at the plurality of positions to a second color differing from the first color.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A, 5A, 6A, and 7A illustrate respective display states of the mobile computing device in a portrait orientation.

FIGS. 4A, 8A, and 9A illustrate respective input tracing states of the mobile computing device in a portrait orientation.

DESCRIPTION OF PARTICULAR EMBODIMENT(S)

Figure 1:
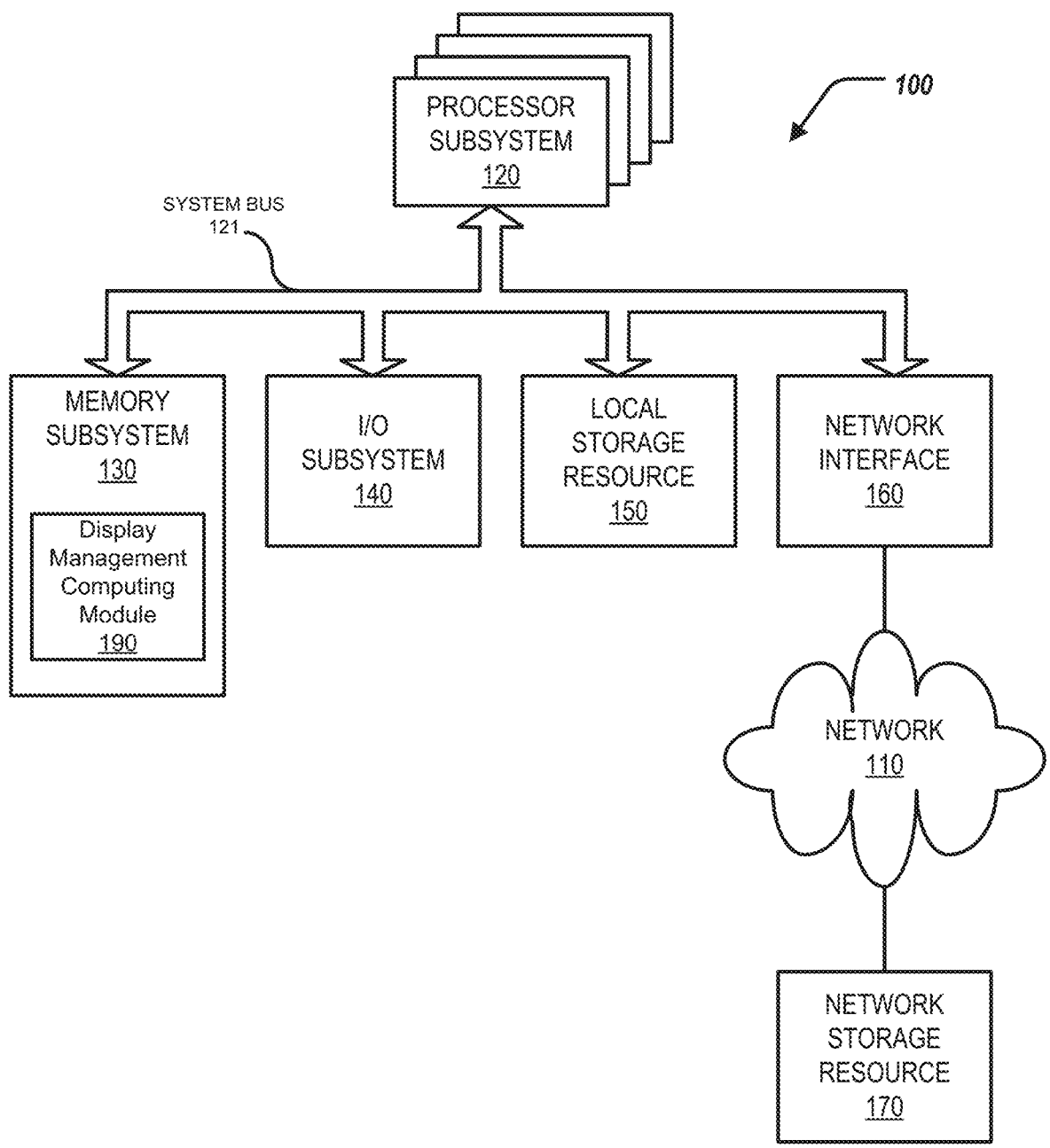
FIG. 1 is a block diagram of selected elements of an embodiment of a computing device.

This disclosure discusses methods and systems for input tracing on a mobile computing device, and specifically, input tracing of user provided touch input at a touchscreen display of a mobile computing device. The user input can be tracked to determine an actual path between a user interactable element and a graphical element. The actual path can be compared to a target path, and based on the deviation between the two, store data indicating a correlation between the user and an appropriate response associated with a graphical element (e.g., a degree of conviction/affinity between the user and the appropriate response associated with the graphical element).

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, a computing device may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a computing device may be a personal computer, a PDA, a consumer electronic device, a network storage device, or another suitable device and may vary in size, shape, performance, functionality, and price. The computing device may include memory, one or more processing resources such as a central processing unit (CPU) or hardware or software control logic. Additional components of the computing device may include one or more storage devices, one or more communications ports for communicating with external devices as well as various input and output (I/O) devices, such as a keyboard, a mouse, and a video display. The computing device may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11D wherein like numbers are used to indicate like and corresponding parts.

Turning now to the drawings, FIG. 1 illustrates a block diagram depicting selected elements of a computing device 100 in accordance with some embodiments of the present disclosure. In various embodiments, computing device 100 may represent different types of portable computing devices, such as, display devices, head mounted displays, head mount display systems, smart phones, tablet computers, notebook computers, media players, digital cameras, 2-in-1 tablet-laptop combination computers, and wireless organizers, or other types of portable computing devices. Components of computing device 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of computing device). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated computing device, such as system 100, is powered down.

In computing device 100, I/O subsystem 140 may comprise a system, device, or apparatus generally operable to receive and/or transmit data to/from/within computing device 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a haptic controller, a virtual reality (VR) controller, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between computing device 100 and a network 110. Network interface 160 may enable computing device 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from computing device 100.

In particular embodiments, network 110 may include one or more routers for routing data between client computing devices 100 and server computing devices 100. A device (e.g., a client computing device 100 or a server computing device 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client computing devices 100 may communicate with one or more server computing devices 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The computing device 100 can also include a display management computing module 190. The display management computing module 190 can be included by the memory subsystem 130. The display management computing module 190 can include a computer-executable program (software). Display management computing module 190 can be executed by the processor subsystem 120.

In short, the display management computing module 190 can facilitate input tracing of user provided touch input at a touchscreen display of a mobile computing device. The display management computing module 190 can track the user input to determine an actual path between a user interactable element and a graphical element. The display management computing module 190 can compare the actual path to a target path, and based on the deviation between the two, store data indicating a correlation between the user and an appropriate response associated with a graphical element.

Figure 2:
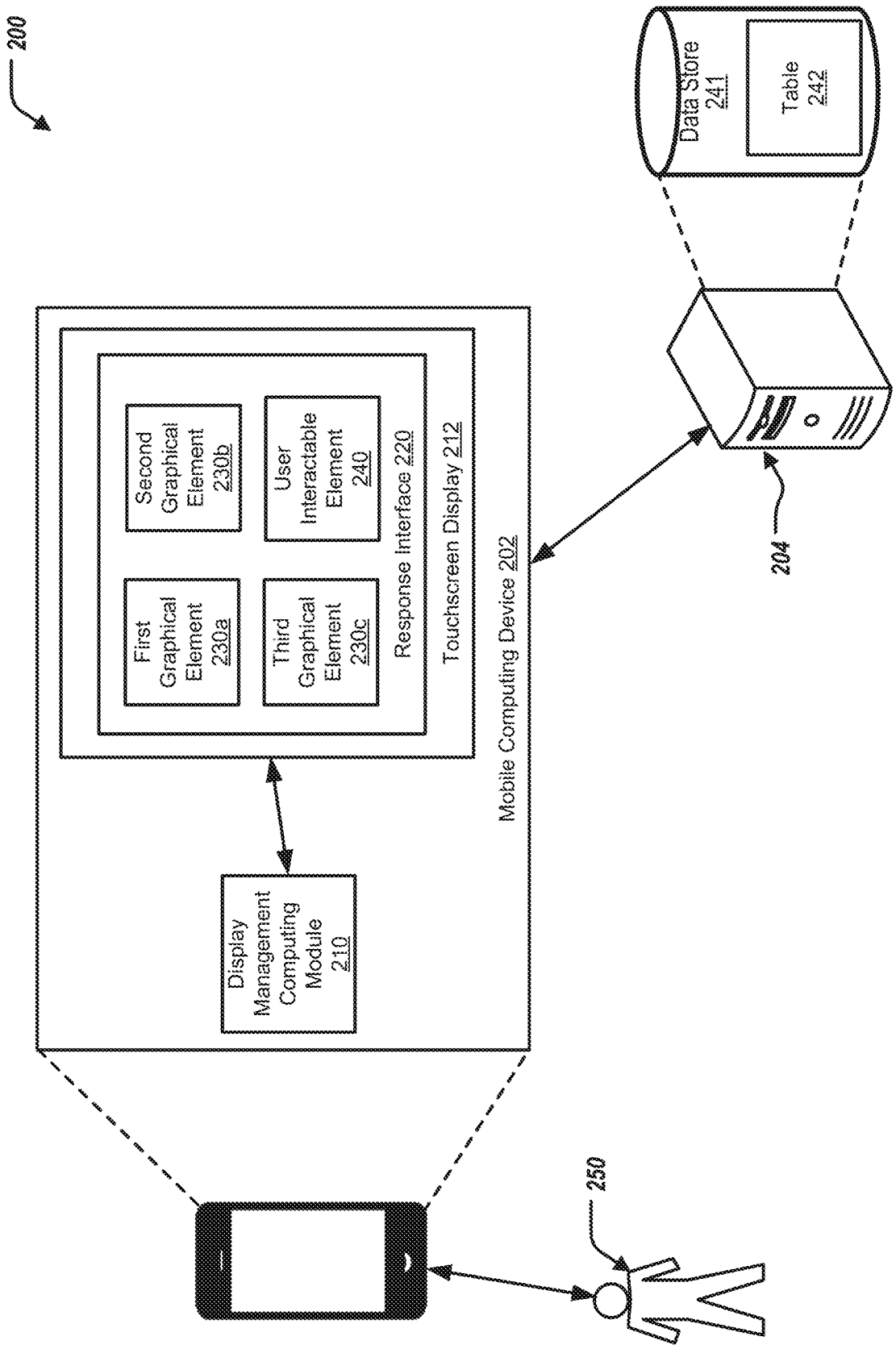
FIG. 2 illustrates a block diagram of a computing environment for input tracing at a mobile computing device.

Turning to FIG. 2, FIG. 2 illustrates an environment 200 including a mobile computing device 202 and a server computing device 204. The computing device 202 can include a display management computing module 210 and a touchscreen display 212. In some examples, the mobile computing device 202 is similar to, or includes, the computing device 100 of FIG. 1. In some examples, the server computing device 204 is similar to, or includes, the computing device 100 of FIG. 1. In some examples, the display management computing module 210 is the same, or substantially the same, as the display management computing module 190 of FIG. 1.

The mobile computing device 202 can be in communication with the server computing device 204 (e.g., over one or more networks). The display management computing module 210 can be in communication with the touchscreen display 212.

The touchscreen display 212 includes a response interface 220 that can present for display multiple elements. In some examples, the response interface 220 can include an entirety of the touchscreen display 212. In some examples, the response interface 220 can include a portion of the touchscreen display 212. In the current example, the response interface 220 can provide for display a first graphical element 230*a*, a second graphical element 230*b*, and a third graphical element 230*c* (collectively referred to as graphical elements 230); however, the response interface 220 can provide for display any number of graphical elements 230. The response interface 220 can further provide for display a user interactable element 240.

The server computing device 204 can include a data store 241 (storage device 241) that stores a table 242. The server computing device 204 is remote from the mobile computing device 202.

A user 250 can interact with the mobile computing device 202, including providing touch input to the touchscreen display 212.

To that end, the mobile computing device 202, and in particular, the display management computing module 210, can perform input tracing of touch input provided by the user 250.

Figure 3B:
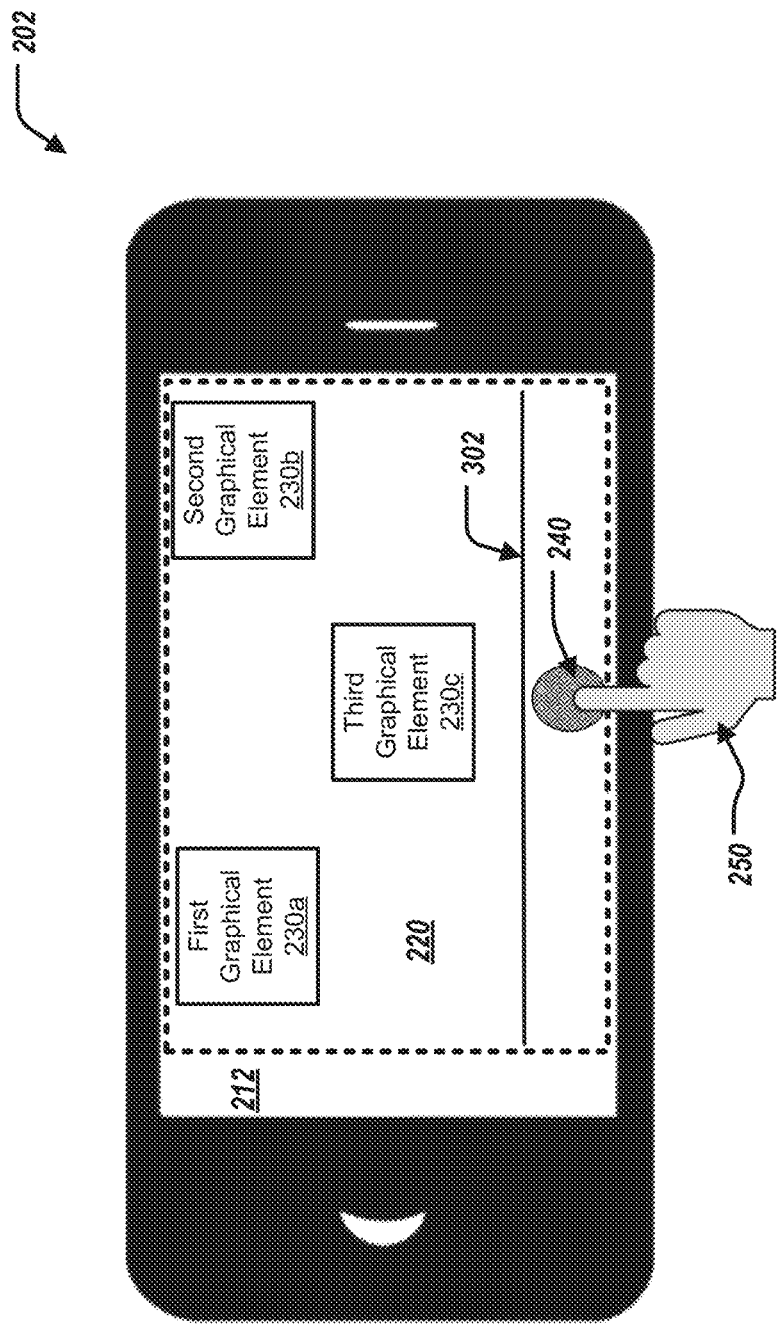
FIGS. 3B, 5B, 6B, and 7B illustrate respective display states of the mobile computing device in a landscape orientation.

FIG. 3A illustrates the mobile computing device 202 in a first display state in a portrait orientation; and FIG. 3B illustrates the mobile computing device 202 in a first display state in a landscape orientation. Referring to FIGS. 2, 3A, 3B, the display management computing module 210 can provide, for display upon the response interface 220 of the touchscreen display 212, the first graphical element 230a at a first graphical position (first position) and the second graphical element 230b at a second graphical position (second position). The first position of the first graphical element 230a and the second position of the second graphical element 230b can be represented by any coordinate system (e.g., Cartesian coordinate system) employed for the response interface 220 of the touch screen display 212 by the mobile computing device 202. The first graphical element 230a can represent a first response, and the second graphical element 230b can represent a second response. For example, the first response and the second response can be associated with the third graphical element 230c, described further herein.

Furthermore, the display management computing module 210 can provide, for display upon the response interface 220 of the touchscreen display 212, the user interactable element 240 at an initial position. The initial position of the user interactable element 240 can be represented by the same coordinate system representing the first graphical element 230a and the second graphical element 230b. In some examples, the user interactable element 240 is provided for display at the initial position at a first color (displayed as a first shading of the user interactable element 240).

In some examples, the response interface 220 can include for display a segmentation indicator 302 (e.g., a line) to segment the response interface 220 into two portions. In some examples, the first graphical element 230a and the second graphical element 230b can be displayed within a first portion and the user interactable element 240 can be displayed, initially, at a second portion (differing from the first portion).

Furthermore, the display management computing module 210 can provide, for display upon the response interface 220 of the touchscreen display 212, the third graphical element 230c at a third position. The third position of the third graphical element 230c can be represented by the same coordinate system representing the first graphical element 230a and the second graphical element 230b. The third graphical element 230c can be associated with the first response of the first graphical element 230a and/or the second response of the second graphical element 230b.

In some examples, the third graphical element 230c can be displayed equidistant between the first graphical element 230a and the second graphical element 230b. That is, based on the coordinate system of the mobile computing device 202, the third graphical element 230c can be displayed equidistant between the first graphical element 230a and the second graphical element 230b. That is, a distance between the third graphical element 230c and the first graphical element 230a is the same as a distance between the third graphical element 230c and the second graphical element 230b. In other words, the third graphical element 230c is displayed "in-between" the first graphical element 230a and the second graphical element 230b.

Figure 4B:
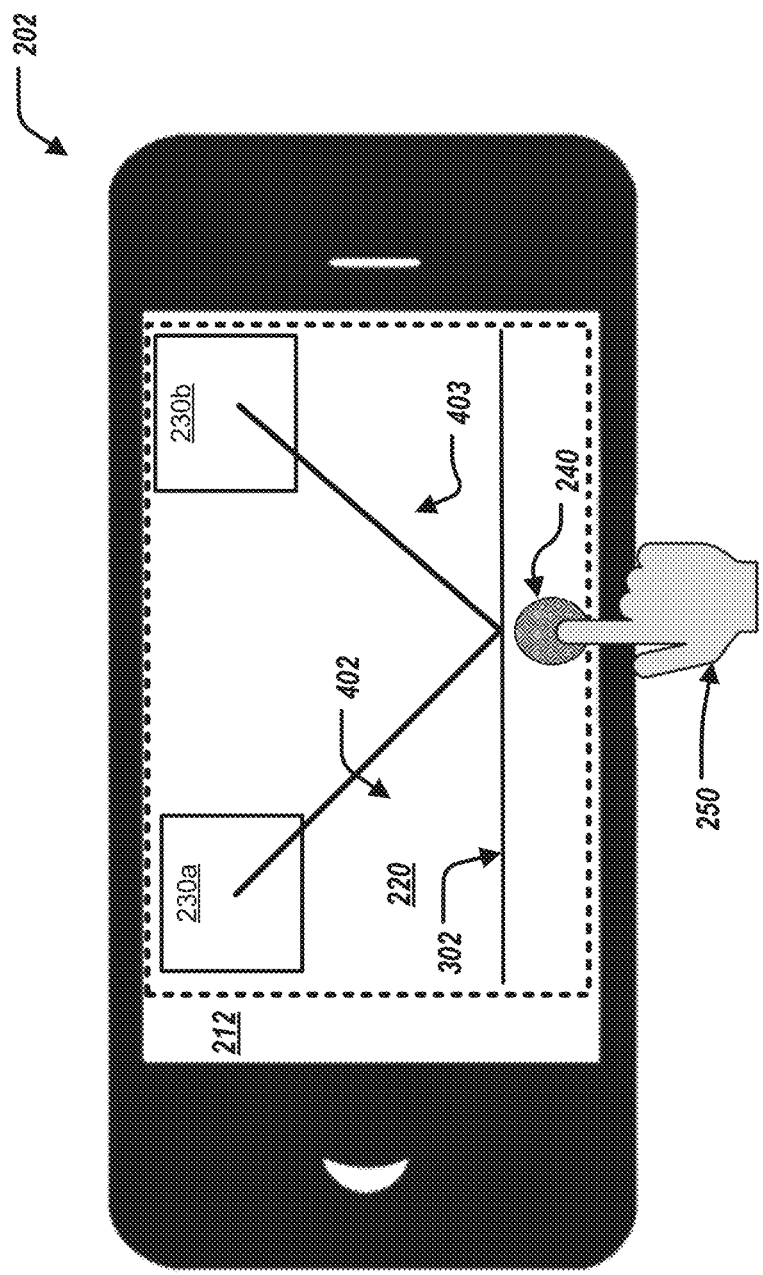
FIGS. 4B, 8B, and 9B illustrate respective input tracing states of the mobile computing device in a landscape orientation.

FIG. 4A illustrates the mobile computing device 202 in a first input tracing state in a portrait orientation; and FIG. 4B illustrates the mobile computing device 202 in a first input tracing state in a landscape orientation. Referring to FIGS. 2, 4A, 4B, the display management computing module 210 can determine a target path 402 between a center of the segmentation indicator 302 and a center of the first position of the first graphical element 230a (for simplicity of illustration of the target path 402, illustration of the third graphical element 230c has been removed for illustration purposes only). Additionally, the display management computing module 210 can determine a target path 403 between a center of the segmentation indicator 302 and a center of the second position of the second graphical element 230b (for simplicity of illustration of the target path 403, illustration of the third graphical element 230c has been removed for illustration purposes only). Further, note that for ease of understanding the target paths 402 and 403, the target paths 402 and 403 are illustrated as displayed upon the touchscreen display 212 for explanatory purposes only and are not seen by the user 250.

The target path 402 is a straight-line path. That is, the target path 402 is the path of shortest distance between the center of the segmentation indictor 302 and the center of the first graphical element 230a. In some examples, the target path 402 is between the center of the initial position of the user interactable element 240 and the center of the first position of the first graphical element 230a.

The target path 403 is a straight-line path. That is, the target path 403 is the path of shortest distance between the center of the segmentation indicator 302 and the center of the second graphical element 230b. In some examples, the target path 403 is between the center of the initial position of the user interactable element 240 and the center of the second position of the second graphical element 230b.

Figure 5A:
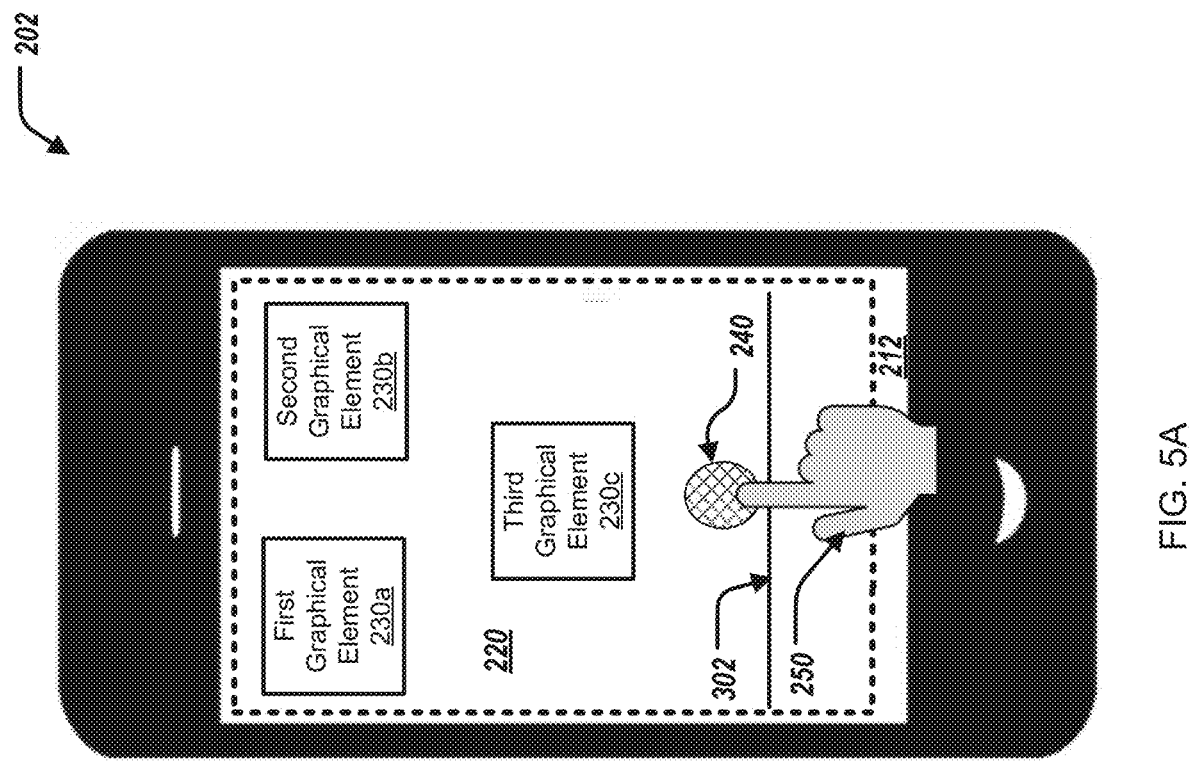
Figure 5B:
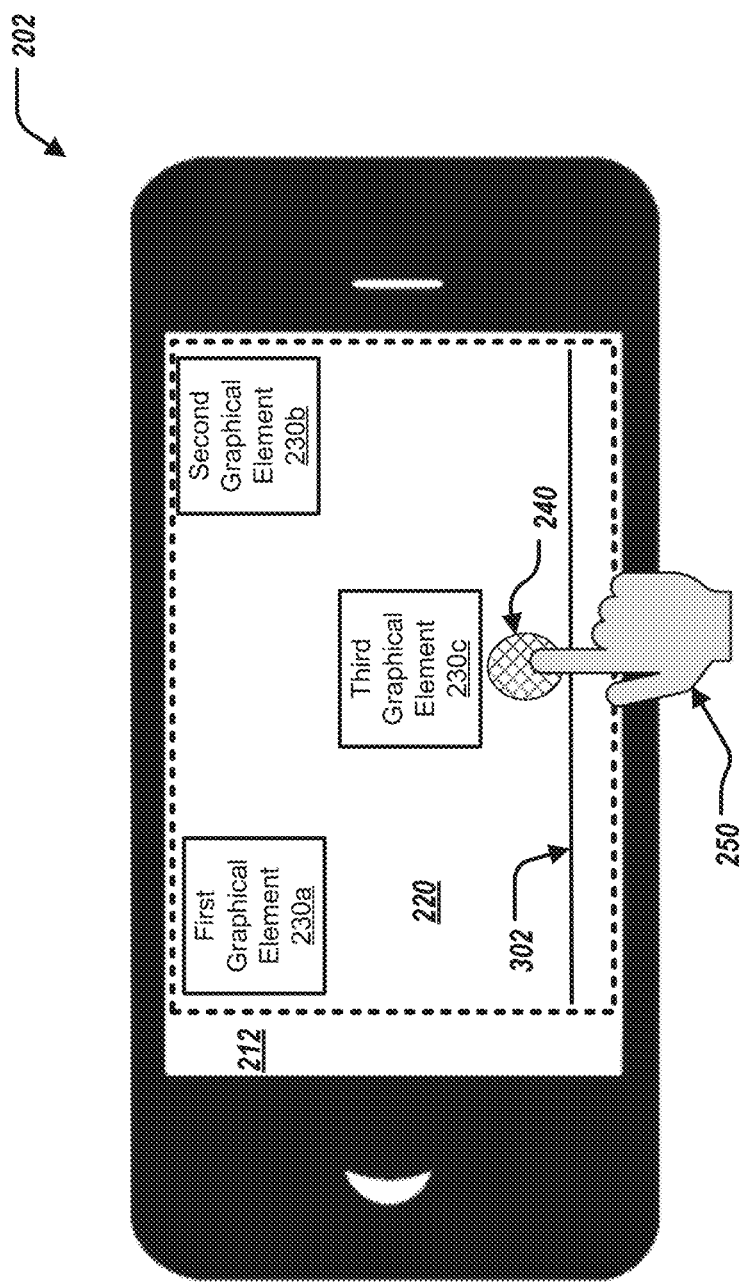
Figure 6A:
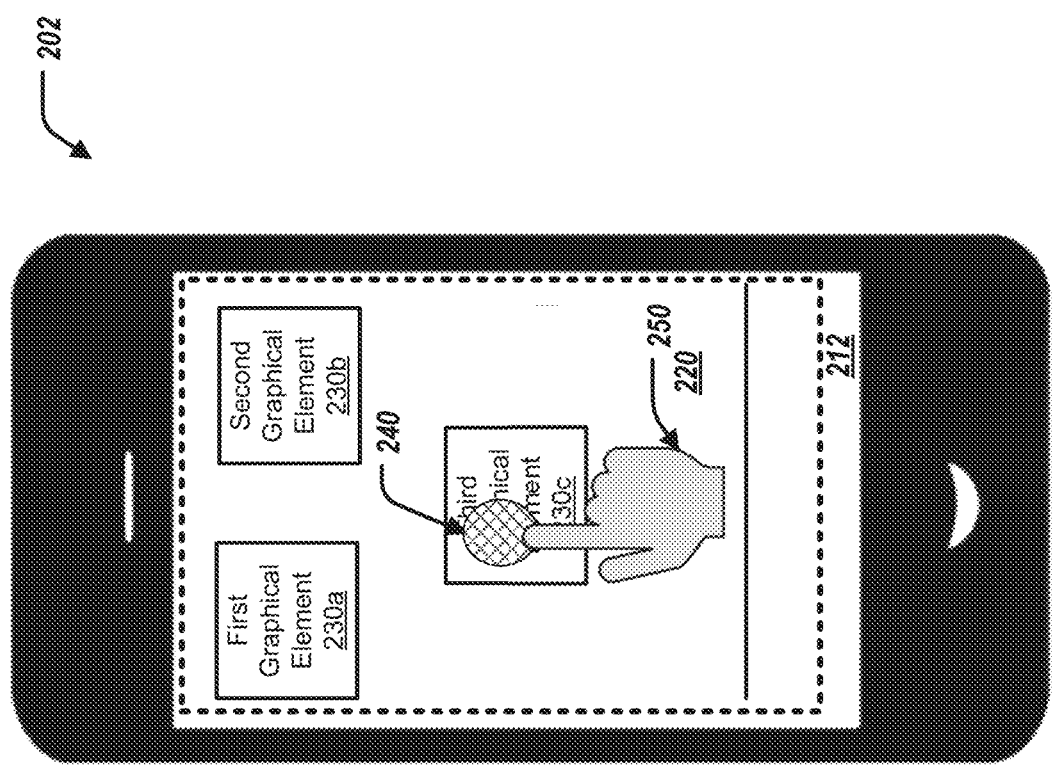
Figure 6B:
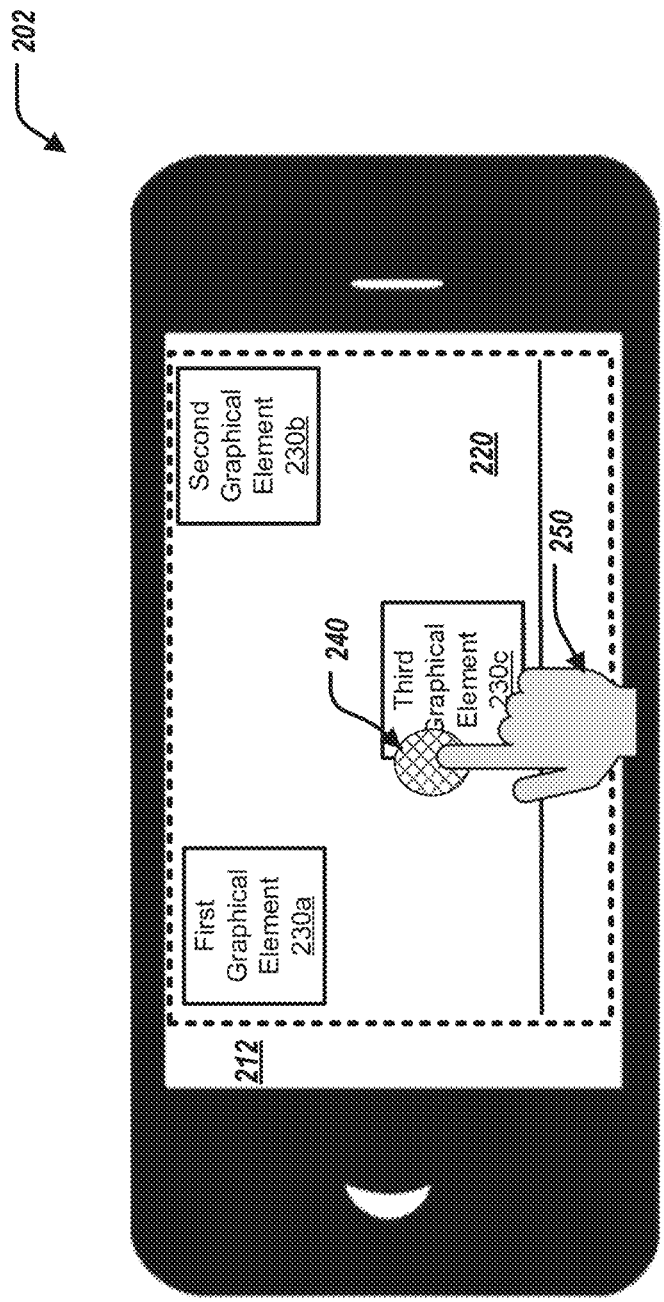
Figure 7A:
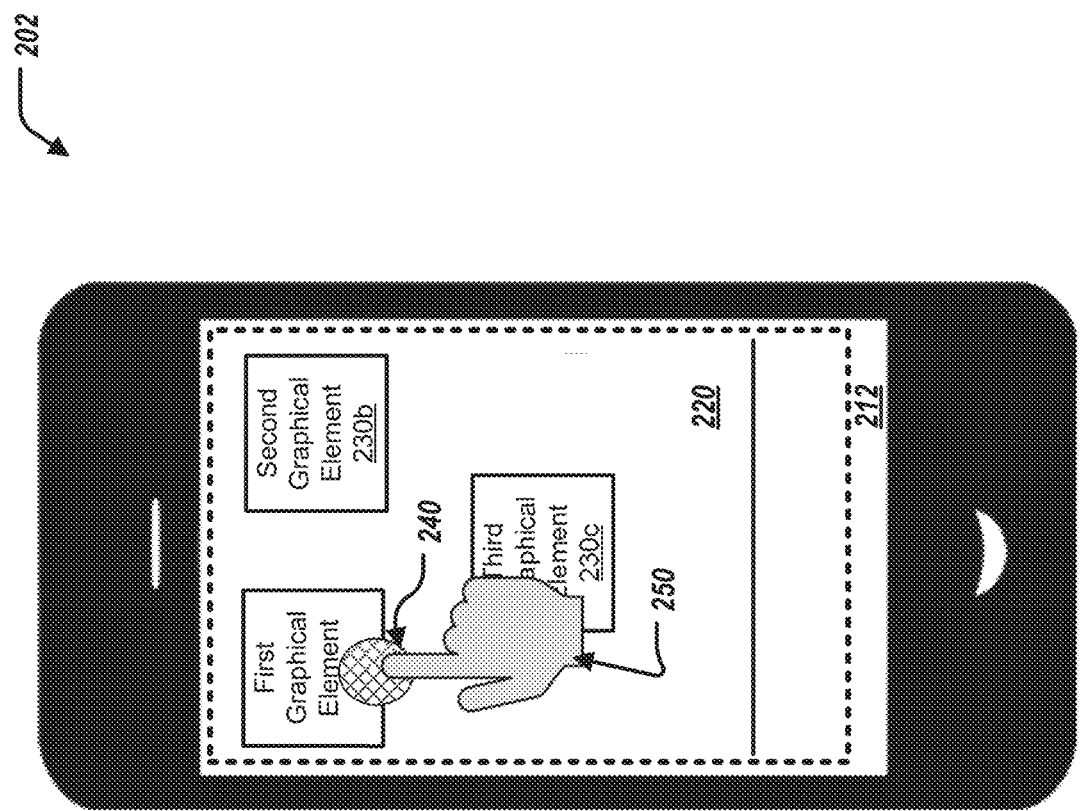
Figure 7B:
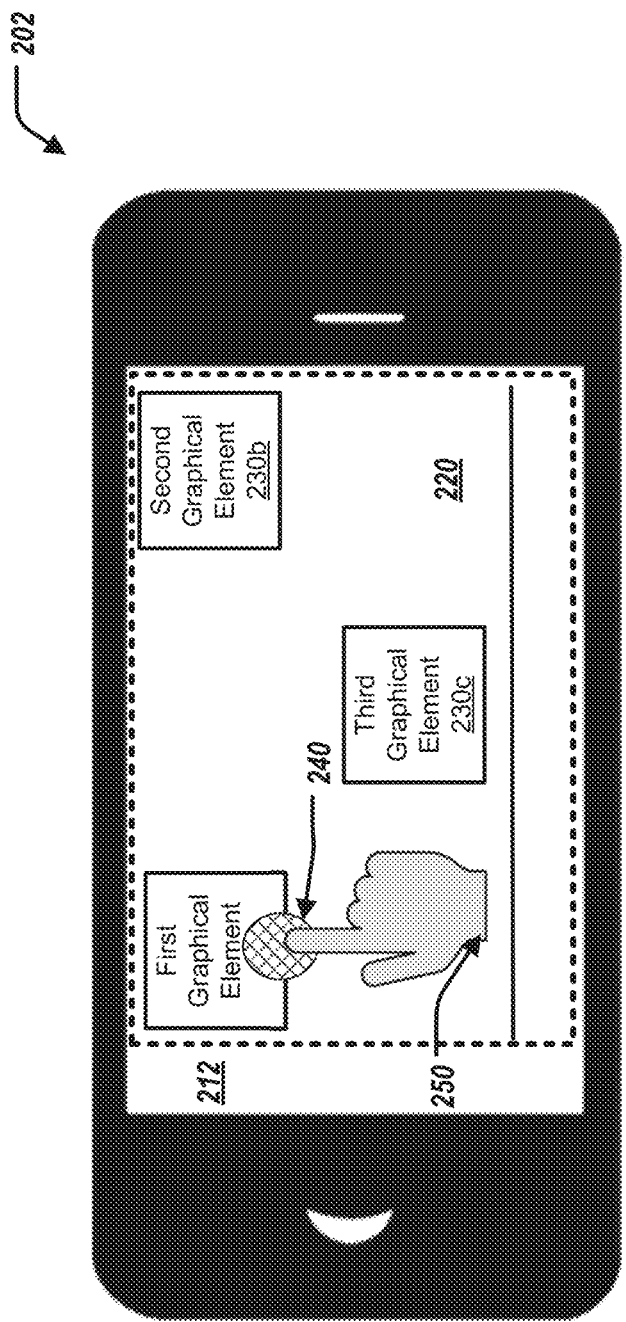

FIGS. 5A, 6A, 7A illustrate a plurality of positions of the user interactable element 240 in a portrait orientation; and FIGS. 5B, 6B, 7B illustrate a plurality of positions of the user interactable element 240 in a landscape orientation. Referring to FIGS. 2, 5A, 5B, 6A, 6B, 7A, 7B, the display management computing module 210 can receive touch-based user input from the user 250 indicating a plurality of positions of the user interactable element 240 with respect to the touchscreen display 212. Specifically, the user 250 can engage the touchscreen display 212 by providing touch-based user input to the touchscreen display 212. The user 250 can engage with the user interactable element 240 to adjust a positioning of the user interactable element 240 with respect to the touchscreen display 212 by "dragging" the user interactable element 240 to a plurality of positions with respect to the touchscreen display 212. Each of the positions of the user interactable element 240 with respect to the touchscreen display 212 can be represented by the same coordinate system representing the graphical elements 230a, 230b, 230c.

As the user 250 provides the touch-based user input to indicate the plurality of positions of the user interactable element 240 with respect to the touchscreen display 212, the display management computing module 210 can update, in response to the touch-based user input, display of the user interactable element 240 upon the touchscreen display 212 based on the plurality of positions. Specifically, as the user 250 provides the touch-based user input "dragging" the user interactable element 240 to each of the plurality of positions, the touchscreen display 212 is updated to display the user interactable element 240 at each of the positions. For example, as illustrated in FIGS. 5A, 5B, the user interactable element 240 is displayed at a first position; as illustrated in FIGS. 6A, 6B, the user interactable element 240 is displayed at a second position; and as illustrated in FIGS. 7A, 7B, the user interactable element 240 is displayed at a third (final) position. In some examples, the display management computing module 210 has a sampling rate of 200 Hz (e.g., 1 sample every 5 milliseconds).

In some examples, the user 250 provides touch-based user input to "drag" the user interactable element 240 "above" the segmentation indicator 302 such that the user interactable element 240 is displayed within the second portion of the response interface 220 (also containing the first graphical element 230a and the second graphical element 230b) from being displayed within the first portion of the response interface 220. In some examples, when the user interactable element 240 is displayed within the second portion of the response interface 220, the display of the user interactable element 240 is updated to a second color (displayed as a second shading of the user interactable element 240).

Further, in some examples, in response to the user interactable element 240 being displayed within the second portion of the response interface, the third graphical element 230c is displayed within the second portion. That is, "dragging" of the user interactable element 240 by the user 250 "above" the segmentation indicator 302 can invoke display of the third graphical element 230c (in the second portion of the response interface 220 also containing the first graphical element 230a and the second graphical element 230b).

In some examples, the third graphical element 230c is displayed within the second portion of the response interface 220 prior to display of the first graphical element 230a and the second graphical element 230b. That is, initially, only the third graphical element 230c is displayed within the second portion of the response interface 220. The user 250 provides touch-based user input to "drag" the user interactable element 240 "above" the segmentation indicator 302 such that the user interactable element 240 is displayed within the second portion of the response interface 220 from being displayed within the first portion of the response interface 220. Further, in some examples, in response to the user interactable element 240 being displayed within the second portion of the response interface, the first graphical element 230a and the second graphical element 230b are displayed within the second portion of the response interface 220. That is, "dragging" of the user interactable element 240 by the user 250 "above" the segmentation indicator 302 can invoke display of the first graphical element 230a and the second graphical element 230b (in the second portion of the response interface 220 also containing the third graphical element 230c).

To that end, as shown in FIGS. 7A, 7B, the final position of the user interactable element 240 coincides with the first position of the first graphical element 230a. That is, the user 250 provides the touch-based user input to "drag" the user interactable element 240 from the initial position to the final position that coincides with the positioning of the first graphical element 230a. In some examples, in response to the final position of the user interactable element 240 coinciding with the first position of the first graphical element 230a, the display management computing module 210 adjusts the presentation of the first graphical element 230a, such as adjusting a border (e.g., a color and/or a thickness) of the first graphical element 230a. However, other adjustments of the presentation of the first graphical element 230a are possible, such as a coloring or resizing of the first graphical element 230a.

Figure 8A:
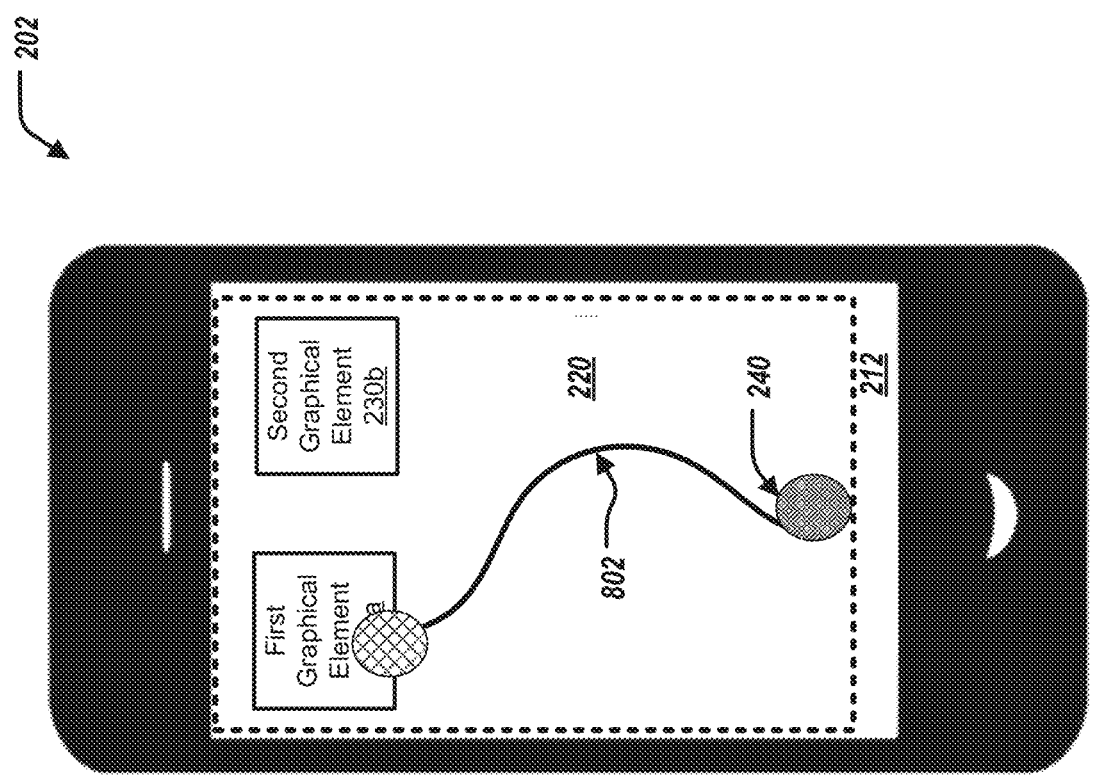
Figure 8B:
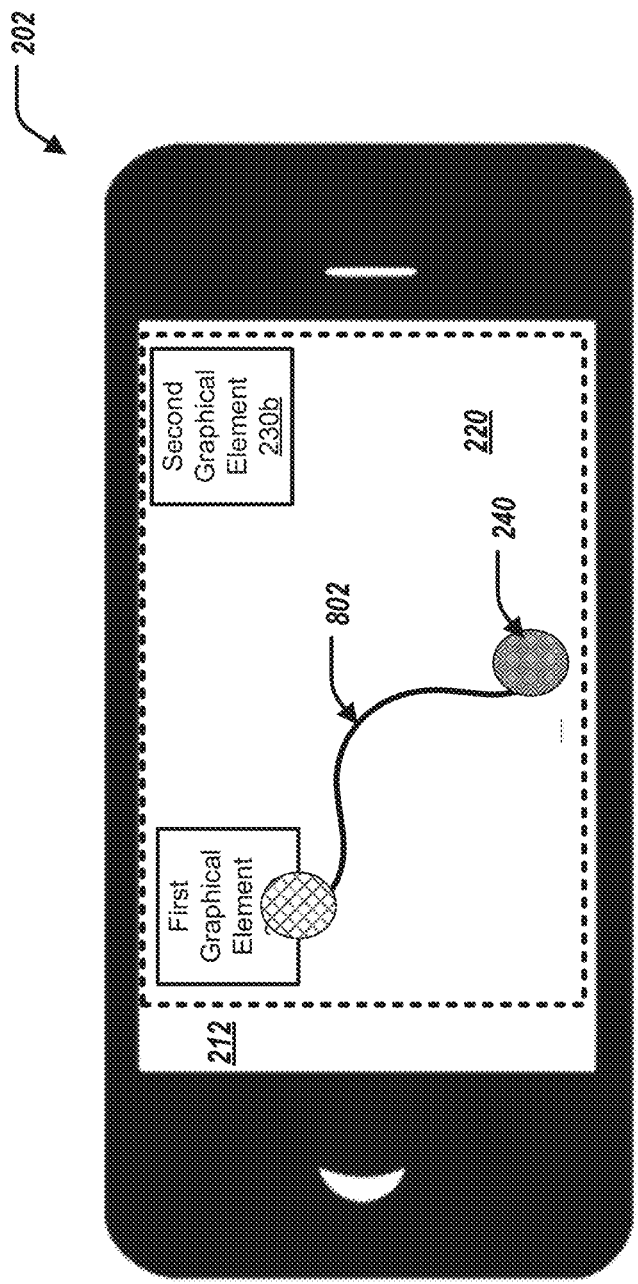

FIG. 8A illustrates the mobile computing device 202 in a second input tracing state in a portrait orientation; and FIG. 8B illustrates the mobile computing device 202 in a second input tracing state in a landscape orientation. Referring to FIGS. 2, 8A, 8B, the display management computing module 210 tracks, based on the plurality of positions of the user interactable element 240 with respect to the touchscreen display 212, an actual path 802 of the user interactable element 240 with respect to the first graphical element 230a. Specifically, the display management computing module 210 can track the actual path 802 of the user interactable element 240 from the initial position of the user interactable element 240 to the final position of the user interactable element 240 (for simplicity of illustration of the actual path 802, illustration of the third graphical element 230c has been removed for illustration purposes only). Further, note that for ease of understanding the actual path 802, the actual path 802 is illustrated as displayed upon the touchscreen display 212 for explanatory purposes only and is not seen by the user 250.

To that end, the display management computing module 210 can track (record) the actual path 802 of the user interactable element 240 with respect to the first graphical element 230a by determining, for each position of the user interactable element 240 with respect to the touchscreen display 212, coordinates of the user interactable element 240 with respect to the touchscreen display 212. That is, for each of the positions of the user interactable element 240 with respect to the touchscreen display 212, as shown in FIGS. 5A-7A and FIGS. 5B-7B, the display management computing module 210 determines the coordinates of the user interactable element 240 with respect to the touchscreen display 212. The display management computing module 210 then performs trajectory analysis of the user interactable element 240 based on the coordinates of each of the positions of the user interactable element 240 with respect to the touchscreen display 212. Specifically, the display management computing module 210 records the actual path 802 of the user interactable element 240 with respect to the first graphical element 230a based on the coordinates of the user interactable element 240 for each position of the user interactable element 240.

As illustrated, the actual path 802 is a curved or sloped line; however, the actual path 802 can have any shape, consistent with the path of the user interactable element 240, which is dependent on the user action(s).

Figure 9A:
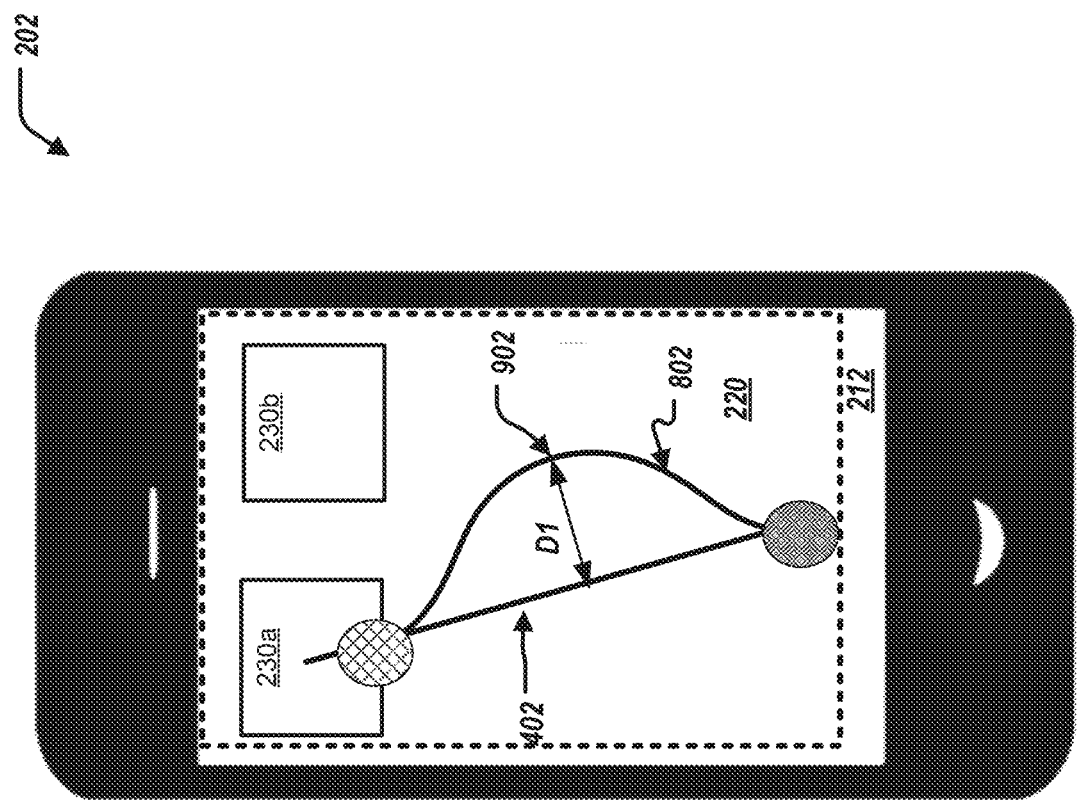
Figure 9B:
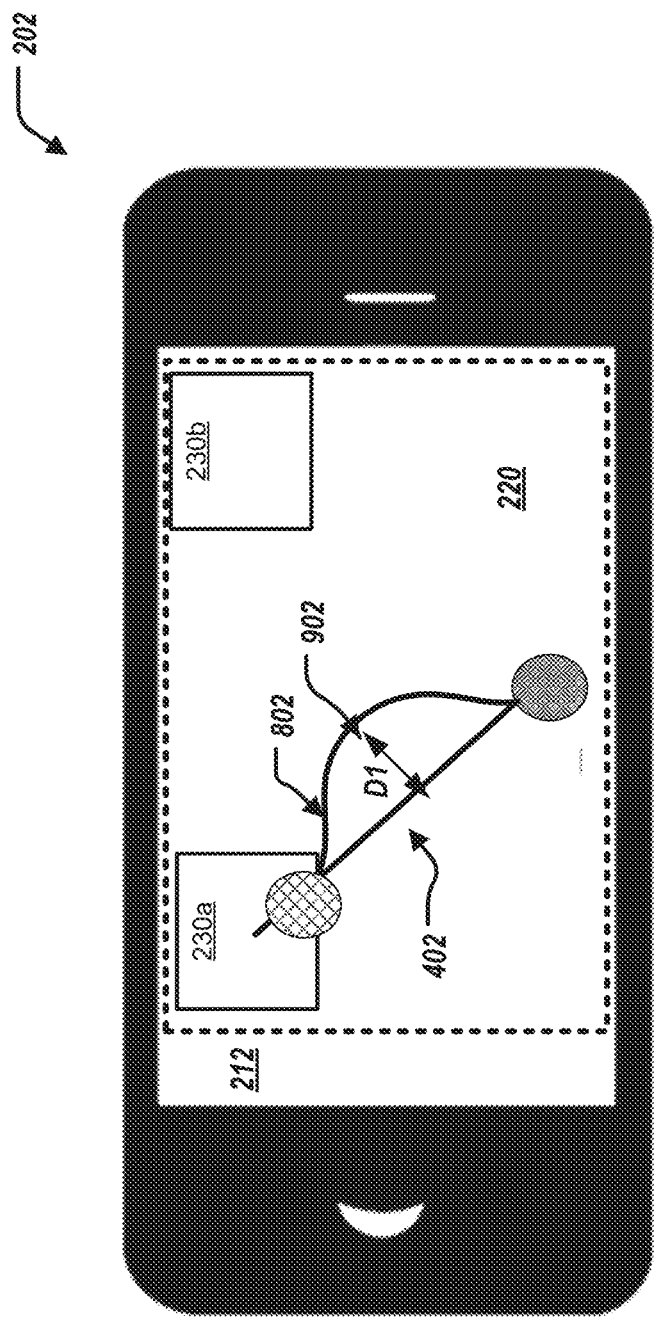

FIG. 9A illustrates the mobile computing device 202 in a third input tracing state in a portrait orientation; and FIG. 9B illustrates the mobile computing device 202 in a third input tracing state in a landscape orientation. Referring to FIGS. 2, 9A, 9B, the display management computing module 210 can calculate a maximum deviation of the actual path 802 from the target path 402 (for simplicity of illustration, illustration of the third graphical element 230c has been removed for illustration purposes only). The display management computing module 210 can further calculate a minimum deviation of the actual path 802 from the target path 403. Further, note that for ease of understanding the target path 402 and the actual path 802, the target path 402 and the actual path 802 are illustrated as displayed upon the touchscreen display 212 for explanatory purposes only and are not seen by the user 250.

The maximum deviation between the actual path 802 and the target path 402 can be where a point of the actual path 802 is the furthest distance from the target path 402. For example, a point 902 of the actual path 802 is at a maximum deviation from the target path 402. In other words, the maximum deviation between the actual path 802 and the target path 402 can be the largest perpendicular distance between the actual path 802 and the target path 402. The display management computing module 210 can determine the maximum deviation of the point 902 of the actual path 802 from the target path 402 by a distance DI between the point 902 of the actual path 802 to the target path 402.

The minimum deviation between the actual path 802 and the target path 403 (shown in FIG. 4A) can be where a point of the actual path 802 is the closest distance to the target path 403. In other words, the minimum deviation between the actual path 802 and the target path 403 can be the minimum perpendicular distance between the actual path 802 and the target path 403.

In some examples, the display management computing module 210 can further calculate a total length of the actual path 802; an area between the actual path 802 and the target path 402; and/or an area between the actual path 802 and the target path 403.

The display management computing module 210 can compare the maximum deviation (of the actual path 802 from the target path 402) to a threshold. For example, data indicating the threshold can be stored in a table in memory (e.g., a data store of the mobile computing device 202). The display management computing module 210 can determine, based on comparing the maximum deviation (of the actual path 802 from the target path 402) to the threshold, whether the maximum deviation is greater than the threshold.

In some examples, the display management computing module 210 can determine, based on comparing the maximum deviation (of the actual path 802 from the target path 402) to the threshold, that the maximum deviation is greater than the threshold. The display management computing module 210, in response to determining that the maximum deviation (of the actual path 802 from the target path 402) is greater than the threshold, can provide data indicating that the maximum deviation is greater than the threshold to the server computing device 204 (e.g., over one or more networks).

The server computing device 204 can store the data indicating that the maximum deviation (of the actual path 802 from the target path 402) is greater than the threshold at the data store 241 within the table 242. Specifically, when i) the final position of the user interactable element 240 coincides with the first position of the first graphical element 230a and ii) the maximum deviation of the actual path 802 from the target path 402 is greater than the threshold, the server computing device 204 can store data indicating a correlation between the user 250 and the second response of the second graphical element 230b. That is, when the user 250 "drags" the user interactable element 240 from the initial position to the final position that coincides with the first graphical element 230a, while also "dragging" the user interactable element 240 such that the actual path 802 has a maximum deviation from the target path 402 greater than a threshold, the mobile computing device 202 can provide data to the server computing device 204 indicating that the user 250 is correlated with the second response of the second graphical element 230b. The server computing device 204 stores, in response to receiving such data, the data at the table 242 of the data store 241.

In some examples, when i) the final position of the user interactable element 240 coincides with the first position of the first graphical element 230a and ii) the maximum deviation of the actual path 802 from the target path 402 is greater than the threshold, the server computing device 204 can store data indicating a degree of correlation between the user 250 and the first response of the first graphical element 230a and/or the second response of the second graphical element 230b. That is, when the user 250 "drags" the user interactable element 240 from the initial position to the final position that coincides with the first graphical element 230a, while also "dragging" the user interactable element 240 such that the actual path 802 has a maximum deviation from the target path 402 greater than a threshold, the mobile computing device 202 can provide data to the server computing device 204 such that the server computing device 204 can determine a degree of correlation between the user 250 and the first response of the first graphical element 230a and/or the second response of the second graphical element 230b and store such correlation at the table 242 of the data store 241. That is, as the maximum deviation of the actual path 802 from the target path 402 increases, the degree of correlation between the user 245 and the first response of the first graphical element 230a decreases and/or the degree of correlation between the user 250 and the second response of the second graphical element 230b increases.

The data store 241 can further store data indicating the maximum deviation, the minimum deviation, the actual path 802, and any identifying information (such as names) associated with the first graphical element 230a and the second graphical element 230b. The data store 241 can further store data indicating the total length of the actual path 802; the area between the actual path 802 and the target path 402; and/or the area between the actual path 802 and the target path 403. The data store 241 can further store data indicating positioning of each element displayed by the response interface 220, including each positioning/coordinates of the graphical elements 230 and the user interactable element 240. The data store 241 can further store data indicating coordinates of the target paths 402, 403 and the actual path 802. The data store 214 can further store a time period (or length of time) when the user 250 "drags" the user interactable element 240 from when the third graphical element 230c is initially displayed until the final position of the user interactable element 240 is obtained.

In some examples, the display management computing module 210 can determine, based on comparing the maximum deviation (of the actual path 802 from the target path 402) to the threshold, that the maximum deviation is less than the threshold. The display management computing module 210, in response to determining that the maximum deviation (of the actual path 802 from the target path 402) is less than the threshold, can provide data indicating that the maximum deviation is less than the threshold to the server computing device 204 (e.g., over one or more networks).

The server computing device 204 can store the data indicating that the maximum deviation (of the actual path 802 from the target path 402) is less than the threshold at the data store 241 within the table 242. Specifically, when i) the final position of the user interactable element 240 coincides with the first position of the first graphical element 230a and ii) the maximum deviation of the actual path 802 from the target path 402 is less than the threshold, the server computing device 204 can store data indicating a correlation between the user 250 and the first response of the first graphical element 230a. That is, when the user 250 "drags" the user interactable element 240 from the initial position to the final position that coincides with the first graphical element 230a, while also "dragging" the user interactable element 240 such that the actual path 802 has a maximum deviation from the target path 402 less than a threshold, the mobile computing device 202 can provide data to the server computing device 204 indicating that the user 250 is correlated with the first response of the first graphical element 230a. The server computing device 204 stores, in response to receiving such data, the data at the table 242 of the data store 241.

In some examples, when i) the final position of the user interactable element 240 coincides with the first position of the first graphical element 230a and ii) the maximum deviation of the actual path 802 from the target path 402 is less than the threshold, the server computing device 204 can store data indicating a degree of correlation between the user 250 and the first response of the first graphical element 230a and/or the second response of the second graphical element 230b. That is, when the user 250 "drags" the user interactable element 240 from the initial position to the final position that coincides with the first graphical element 230a, while also "dragging" the user interactable element 240 such that the actual path 802 has a maximum deviation from the target path 402 less than a threshold, the mobile computing device 202 can provide data to the server computing device 204 such that the server computing device 204 can determine a degree of correlation between the user 250 and the first response of the first graphical element 230a and/or the second response of the second graphical element 230b and store such correlation at the table 242 of the data store 241. That is, as the maximum deviation of the actual path 802 from the target path 402 decreases, the degree of correlation between the user 250 and the first response of the first graphical element 230a increases and/or the degree of correlation between the user 250 and the second response of the second graphical element 230b decreases.

In some examples, the display management computing module 210 can determine a time period between initial display of the third graphical element 230c and the final position of the user interactable element 240. That is, the display management computing module 210 can determine a time period (or length of time) when the user 250 "drags" the user interactable element 240 from when the third graphical element 230c is initially displayed until the final position of the user interactable element 240 is obtained. The mobile computing device 202 can provide data indicating such time period to the server computing device 204. The server computing device 204 can receive the data, and in response, store the data at the data store 241 indicating the time period. Specifically, the server computing device 204 can store the data indicating the time period for the correlation (or affinity) between the user 250 and the second response (when the user 250 is correlated with the second response); or correlation between the user 250 and the first response (when the user 250 is correlated with the first response).

For example, the server computing device 204 can store the data indicating the time period for or at the data store 240 within the table 242. Specifically, when i) the final position of the user interactable element 240 coincides with the first position of the first graphical element 230a, ii) the maximum deviation of the actual path 802 from the target path 402 is greater than the threshold, and ii) the time period is larger than a time threshold, the server computing device 204 can store data indicating a correlation between the user 250 and the second response of the second graphical element 230b. That is, when the user 250 "drags" the user interactable element 240 from the initial position to the final position that coincides with the first graphical element 230a, while also "dragging" the user interactable element 240 such that the actual path 802 has a maximum deviation from the target path 402 greater than a threshold for a time period larger than a time threshold, the mobile computing device 202 can provide data to the server computing device 204 indicating that the user 250 is correlated with the second response of the second graphical element 230b. The server computing device 204 stores, in response to receiving such data, the data at the table 242 of the data store 241.

In some examples, when the user 250 provides touch-based user input to "drag" the user interactable element 240 such that the final position of the user interactable element 240 coincides with the first position of the first graphical element 230a and the time period is greater than a time threshold, the display management computing module 210 can indicate to the user 250, e.g., via the display 212, a notification. The notification can display text such as "please be faster in providing your response" to indicate to the user 250 to provide the touch-based user input of the user interactable element 240 less than the time threshold (e.g., "faster").

In some examples, the target paths 402, 403 are determined by a third-party computing device. In some examples, the target paths 402, 403 are determined after recording the actual path 802. In some examples, the target paths 402, 403 are determined by a third-party computing device after recording the actual path 802.

In some examples, the maximum deviation of the actual path 802 from the target path 402 can be determined by a third-party computing device. In some examples, the minimum deviation of the actual path 802 from the target path 403 can be determined by a third-party computing device.

In some examples, the user 250 can interact with the mobile computing device 202 multiple times such that multiple iterations of the input tracing is performed for multiple scenarios of the graphical elements 230. In some examples, the threshold (for comparison with the maximum deviation of the actual path 802 from the target path 402) can be based on a distribution of the maximum deviation for each iteration of the input tracing. In some examples, the display management computing module 210 can determine whether the maximum deviation is greater than the threshold after completion of each of the multiple iterations of the input tracing of the graphical elements.

Note that description of "selection" of the first graphical element 230a is additionally applicable to the "selection" of the second graphical element 230b. That is, description of interaction between the user interactable element 240 and the first graphical element 230a is additionally applicable to the second graphical element 230b. For example, the management computing module 210 can calculate a maximum deviation of an actual path between the user interactable element 240 and the target path 403; and calculate a minimum deviation of an actual path between the user interactable element 240 and the target path 402.

Figure 10:
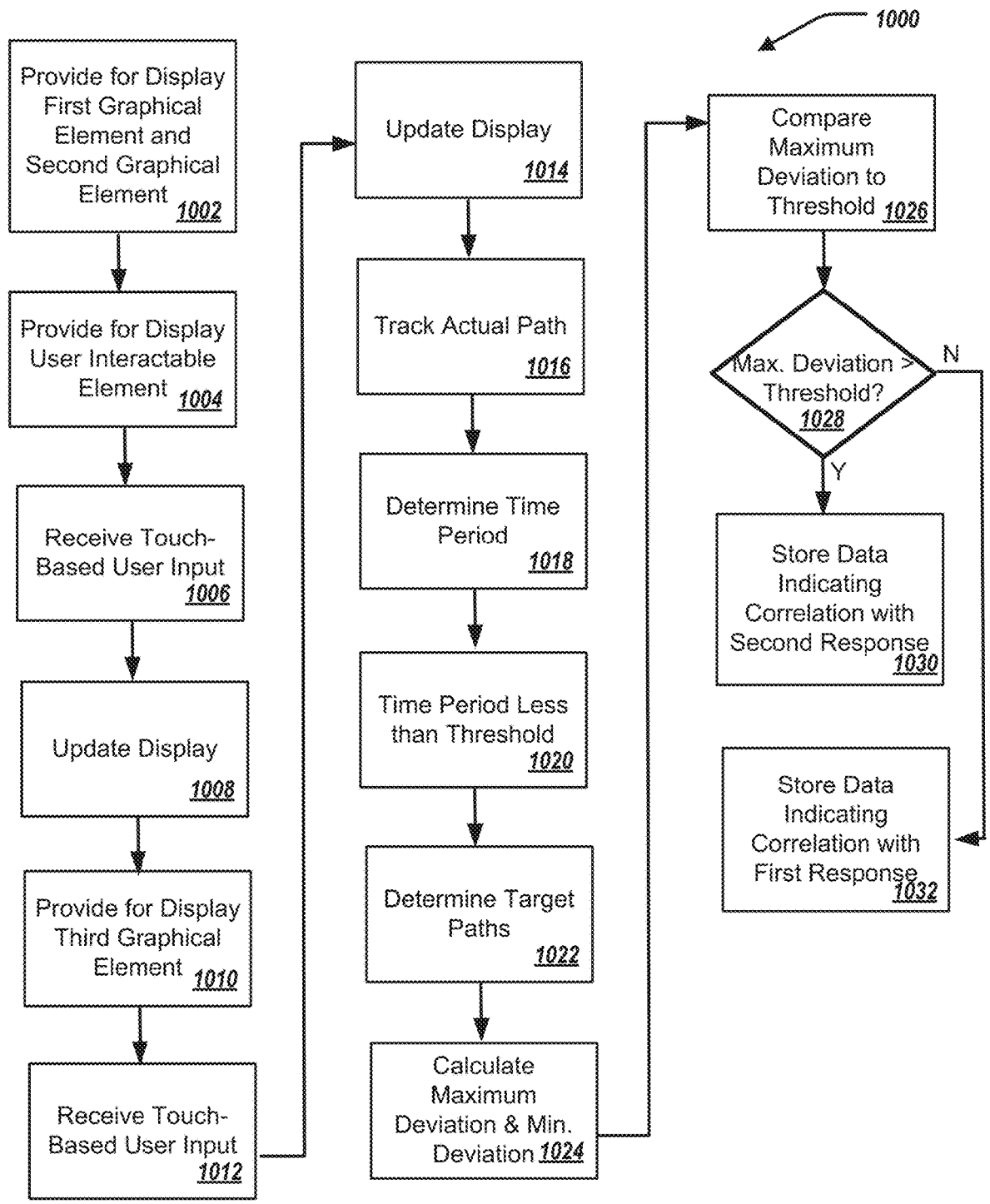
FIGS. 10, and 12 illustrate respective methods for input tracing at a mobile computing device.

FIG. 10 illustrates a flowchart depicting selected elements of an embodiment of a method 1000 for input tracing at a mobile computing device. The method 1000 may be performed by the computing device 100, the mobile computing device 202, the server computing device 204, and/or the display management computing module 210, and with reference to FIGS. 1-9. It is noted that certain operations described in method 1000 may be optional or may be rearranged in different embodiments.

The display management computing module 210 provides, for display upon the touchscreen display 212, the first graphical element 230a at a first position and the second graphical element 230b at a second position, at 1002. In some examples, the first graphical element 230a represents a first response and the second graphical element 230b represents a second response. The display management computing module 210 provides, for display upon the touchscreen display 212, the user interactable element 240 at an initial position, at 1004. The display management computing module 210 receives touch-based user input from the user 250 indicating a position of the user interactable element 240 with respect to the touchscreen display 212, at 1006. Specifically, the management computing module 210 receives user input indicating a position of the user interactable element 240 being displayed within the second portion of the response interface (also containing the first graphical element 230a and the second graphical element 230b). The display management computing module 210 updates, in response to the touch-based user input, display of the user interactable element 240 upon the touchscreen display 212 based on the position, 1008.

The display management computing module 210 provides, for display upon the touchscreen display 212, the third graphical element 230c, at 1010. In some examples, the third graphical element 230c is associated with the first response and the second response. The display management computing module 210 receives touch-based user input from the user 250 indicating a plurality of positions of the user interactable element 240 with respect to the touchscreen display 212, at 1012. Specifically, in some examples, the plurality of positions include a final position of the user interactable element 240 that coincides with the first position of the first graphical element 230a. The display management computing module 210 updates, in response to the touch-based user input, display of the user interactable element 240 upon the touchscreen display 212 based on the plurality of positions, 1014.

The display management computing module 210 tracks, based on the plurality of positions of the user interactable element 240 with respect to the touchscreen display 212, the actual path 802 of the user interactable element 240 with respect to the first graphical element 230a, at 1016. The display management computing module 210 can determine a time period between initial display of the third graphical element 230c and the final position of the user interactable element 240, at 1018. The display management computing module 210 can determine that the time period between initial display of the third graphical element 230c and the final position of the user interactable element 240 is less than a threshold, at 1020. In response to determining that the time period between initial display of the third graphical element 230c and the final position of the user interactable element 240 is less than the threshold, the display management computing module 210 determines the target path 402 between the center of the segmentation indicator 302 and the center of the first position of the first graphical element 230a and the target path 403 between the center of the segmentation indicator 302 and the center of the second position of the second graphical element 230b, at 1022.

The display management computing module 210 calculates a maximum deviation of the actual path 802 from the target path 402 and a minimum deviation of the actual path 802 from the target path 403, at 1024. The display management computing module 210 compares the maximum deviation to a threshold, at 1026. The display management computing module 210 determines, based on the comparing, whether the maximum deviation is greater than the threshold, at 1028. When the display management computing module 210 determines, based on the comparing, that the maximum deviation is greater than the threshold, the display management computing module 210 stores data at the data store 241 remote from the mobile computing device 202 indicating a correlation between the user 250 and the second response, at 1030. In some examples, when the display management computing module 210 determines, based on the comparing, that the maximum deviation is greater than the threshold, the display management computing module 210 stores data at the data store 241 remote from the mobile computing device 202 indicating a degree of correlation between the user 250 and the first response of the first graphical element 230a and/or the second response of the second graphical element 230b. For example, the degree of correlation with respect to the first response of the first graphical element 230a can indicate a high hesitation of the user 250 with respect to the first response. When the display management computing module 210 determines, based on the comparing, that the maximum deviation is less than the threshold, the display management computing module 210 stores data at the data store 240 remote from the mobile computing device 202 indicating a correlation between the user 250 and the first response, at 1032. In some examples, when the display management computing module 210 determines, based on the comparing, that the maximum deviation is less than the threshold, the display management computing module 210 stores data at the data store 241 remote from the mobile computing device 202 indicating a degree of correlation between the user 250 and the first response of the first graphical element 230a and/or the second response of the second graphical element 230b. For example, the degree of correlation with respect to the first response of the first graphical element 230a can indicate a low hesitation of the user 250 with respect to the first response.

In some examples, the method 1000 can be performed by multiple mobile computing device 202, each associated with a respective user 250, and in communication with the server computing device 204.

In some examples, the response interface 220 of the touchscreen display 212 of each of the multiple computing devices 202 is substantially the same. That is, the dimensions of the response interface 220 of the touchscreen display 212 of each of the multiple computing devices 202 is substantially the same. That is, the proportions of the response interface 220 of the touchscreen display 212 of each of the multiple computing devices 202 is the same. Additionally, in some examples, the coordinate system of the response interface 220 of the touchscreen display 212 of each of the multiple computing devices 202 is substantially the same.

In some example, the response interface 220 of the touchscreen display 212 of a first subset of the multiple computing devices 220 can differ from a second subset of the multiple computing devices 220. That is, the dimensions (proportions) of the response interface 220 of the touchscreen display 212 of the first subset of the multiple computing devices 220 differ from the dimensions (proportions) of the response interface 220 of the touchscreen display 212 of the second subset of the multiple computing devices 202. The response interface 220 can be calibrated for each respective subset of the multiple computing devices 220 based on the dimensions of the touch screen display 212 of each respective subset of the multiple computing devices 220.

In some examples, when the display management computing module 210 receives, touch-based user input from the user 250 indicating a plurality of positions of the user interactable element 240 with respect to the touchscreen display 212 (at 1012), and the touch-based user input is discontinuous (e.g., the user 250 lifts his/her finger from "dragging" the user interactable element 240 prior to the final position of the user interactable element 240 coinciding with the first position of the first graphical element 230a), the method 1000 is reverted to step 1004.

Figure 12:
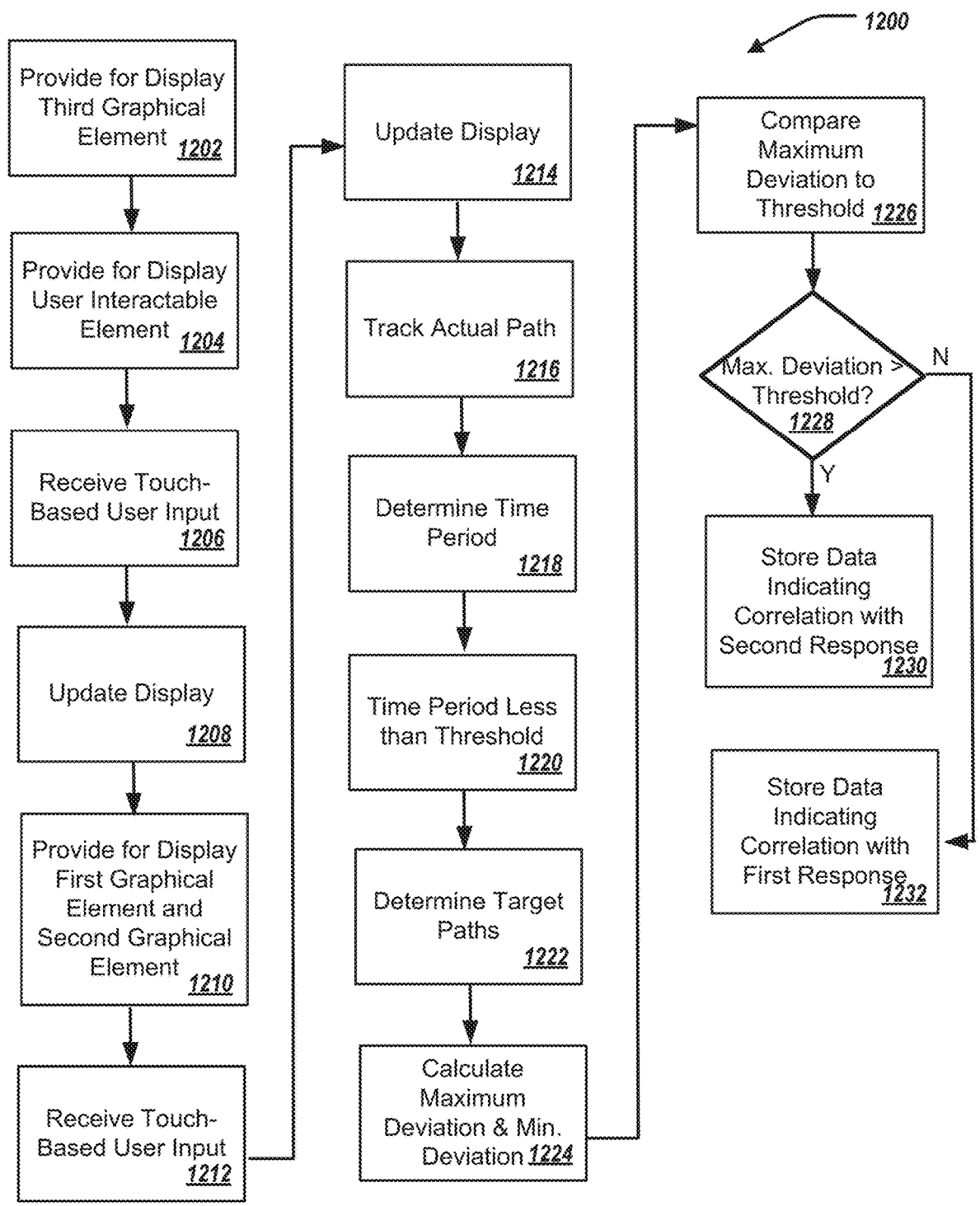

FIG. 12 illustrates a flowchart depicting selected elements of an embodiment of a method 1200 for input tracing at a mobile computing device. The method 1200 may be performed by the computing device 100, the mobile computing device 202, the server computing device 204, and/or the display management computing module 210, and with reference to FIGS. 1-9. It is noted that certain operations described in method 1200 may be optional or may be rearranged in different embodiments.

The display management computing module 210 provides, for display upon the touchscreen display 212, the third graphical element 230c, at 1202. In some examples, the third graphical element 230c is associated with the first response and/or the second response. The display management computing module 210 provides, for display upon the touchscreen display 212, the user interactable element 240 at an initial position, at 1204. The display management computing module 210 receives touch-based user input from the user 250 indicating a position of the user interactable element 240 with respect to the touchscreen display 212, at 1206. Specifically, the management computing module 210 receives user input indicating a position of the user interactable element 240 being displayed within the second portion of the response interface 220 (also containing the first graphical element 230a and the second graphical element 230b). The display management computing module 210 updates, in response to the touch-based user input, display of the user interactable element 240 upon the touchscreen display 212 based on the position, 1208.

The display management computing module 210 provides, for display upon the touchscreen display 212, the first graphical element 230a at a first position and the second graphical element 230b at a second position, at 1210. In some examples, the first graphical element 230a represents a first response and the second graphical element 230b represents a second response. The display management computing module 210 receives, touch-based user input from the user 250 indicating a plurality of positions of the user interactable element 240 with respect to the touchscreen display 212, at 1212. Specifically, in some examples, the plurality of positions include a final position of the user interactable element 240 that coincides with the first position of the first graphical element 230a. The display management computing module 210 updates, in response to the touch-based user input, display of the user interactable element 240 the touchscreen display 212 based on the plurality of positions, 1214.

The display management computing module 210 tracks, based on the plurality of positions of the user interactable element 240 with respect to the touchscreen display 212, the actual path 802 of the user interactable element 240 with respect to the first graphical element 230a, at 1216. The display management computing module 210 can determine a time period between initial display of the graphical elements 230a, 230b and the final position of the user interactable element 240, at 1218. The display management computing module 210 can determine that the time period between initial display of the graphical elements 230a, 230b and the final position of the user interactable element 240 is less than a threshold, at 1220. In response to determining that the time period between initial display of the graphical elements 230a, 230b and the final position of the user interactable element 240 is less than the threshold, the display management computing module 210 determines the target path 402 between the center of the segmentation indicator 302 and the center of the first position of the first graphical element 230a and the target path 403 between the center of the segmentation indicator 302 and the center of the second position of the second graphical element 230b, at 1222.

The display management computing module 210 calculates a maximum deviation of the actual path 802 from the target path 402 and a minimum deviation of the actual path 802 from the target path 403, at 1224. The display management computing module 210 compares the maximum deviation to a threshold, at 1226. The display management computing module 210 determines, based on the comparing, whether the maximum deviation is greater than the threshold, at 1228. When the display management computing module 210 determines, based on the comparing, that the maximum deviation is greater than the threshold, the display management computing module 210 stores data at the data store 241 remote from the mobile computing device 202 indicating a correlation between the user 250 and the second response, at 1230. In some examples, when the display management computing module 210 determines, based on the comparing, that the maximum deviation is greater than the threshold, the display management computing module 210 stores data at the data store 241 remote from the mobile computing device 202 indicating a degree of correlation between the user 250 and the first response of the first graphical element 230a and/or the second response of the second graphical element 230b. For example, the degree of correlation with respect to the first response of the first graphical element 230a can indicate a high hesitation of the user 250 with respect to the first response. When the display management computing module 210 determines, based on the comparing, that the maximum deviation is less than the threshold, the display management computing module 210 stores data at the data store 240 remote from the mobile computing device 202 indicating a correlation between the user 250 and the first response, at 1232. In some examples, when the display management computing module 210 determines, based on the comparing, that the maximum deviation is less than the threshold, the display management computing module 210 stores data at the data store 241 remote from the mobile computing device 202 indicating a degree of correlation between the user 250 and the first response of the first graphical element 230a and/or the second response of the second graphical element 230b. For example, the degree of correlation with respect to the first response of the first graphical element 230a can indicate a low hesitation of the user 250 with respect to the first response.

In some examples, the method 1200 can be performed by multiple mobile computing device 202, each associated with a respective user 250, and in communication with the server computing device 204.

In some examples, when the display management computing module 210 receives, touch-based user input from the user 250 indicating a plurality of positions of the user interactable element 240 with respect to the touchscreen display 212 (at 1212), and the touch-based user input is discontinuous (e.g., the user 250 lifts his/her finger from "dragging" the user interactable element 240 prior to the final position of the user interactable element 240 coinciding with the first position of the first graphical element 230a), the method 1200 is reverted to step 1204.

Figure 11A:
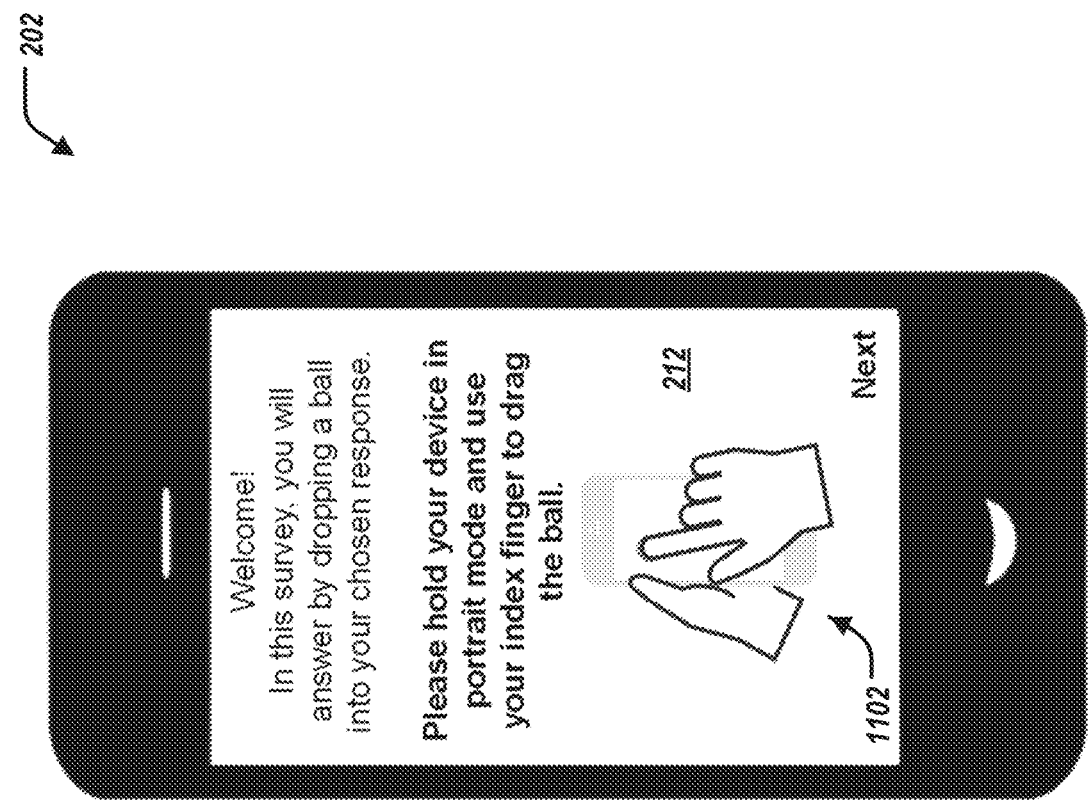
FIGS. 11A-11D illustrate respective display states of the mobile computing device in a training scenario.

FIGS. 11A-11D illustrate the mobile computing device 202 in a training scenario for the user 250. Referring to FIG. 11A, upon initialization of input tracing at the mobile computing device 202, the touchscreen display 212 displays an initial interface 1102. For example, the initial interface 1102 can include text indicating instructions for the user 250 on how to provide touch based user input to facilitate performance of the input tracing at the mobile computing device 202, including a graphical illustration illustrating how to provide touch based user input to facilitate performance of the input tracing at the mobile computing device 202.

Figure 11B:
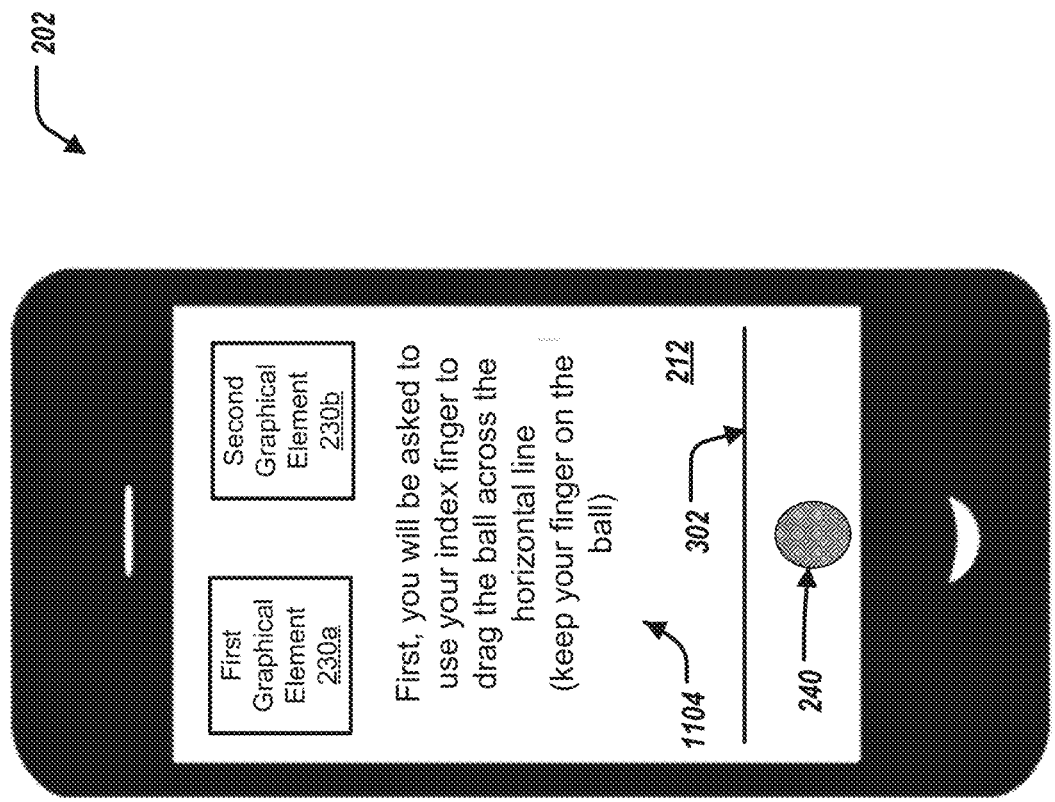

Referring to FIG. 11B, the touchscreen display 212 can display a second interface 1104 after providing the initial interface 1102. For example, the second interface 1104 can include further text indicating instructions for the user 250 on how to provide touch based user input to facilitate performance of the input tracing at the mobile computing device 202. The second interface 1104 can further provide for display the first graphical element 230a at the first location, the second graphical element 230b at the second location, the user interactable interface element 240, and the segmentation indicator 302.

Figure 11C:
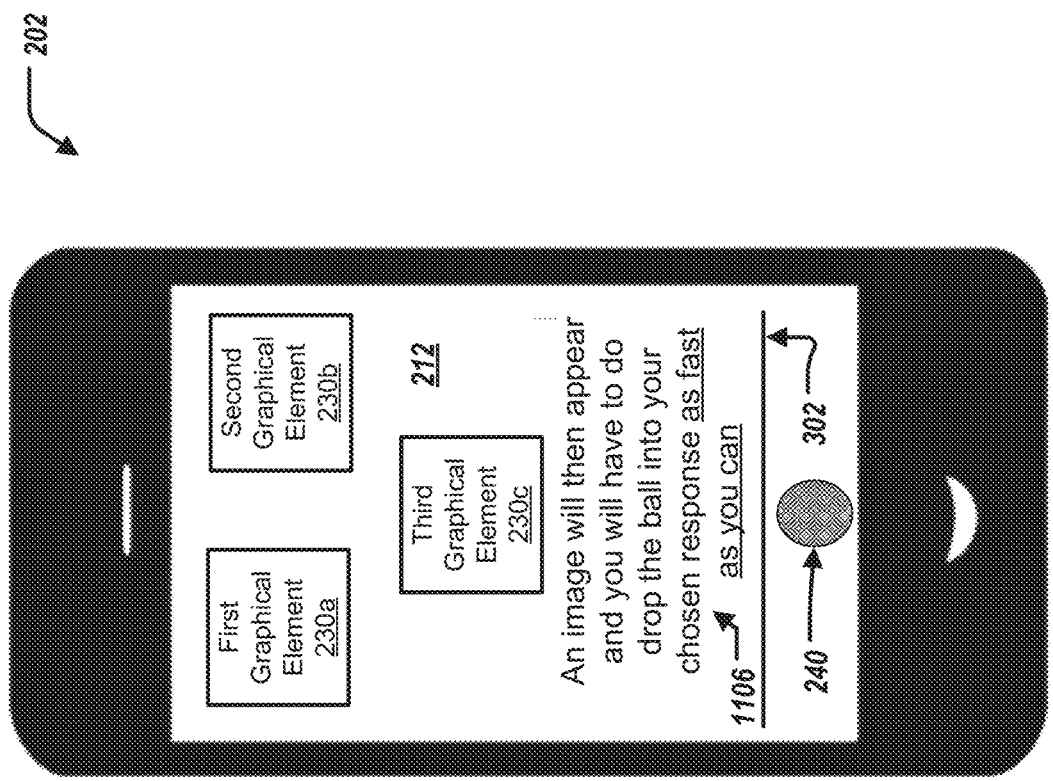

Referring to FIG. 11C, the touchscreen display 212 can display a third interface 1106 after providing the second interface 1104. For example, the third interface 1106 can include further text indicating instructions for the user 250 on how to provide touch based user input to facilitate performance of the input tracing at the mobile computing device 202. The third interface 1106 can further provide for display the first graphical element 230a at the first location, the second graphical element 230b at the second location, the third graphical element 230c, the user interactable interface element 240, and the segmentation indicator 302.

Figure 11D:
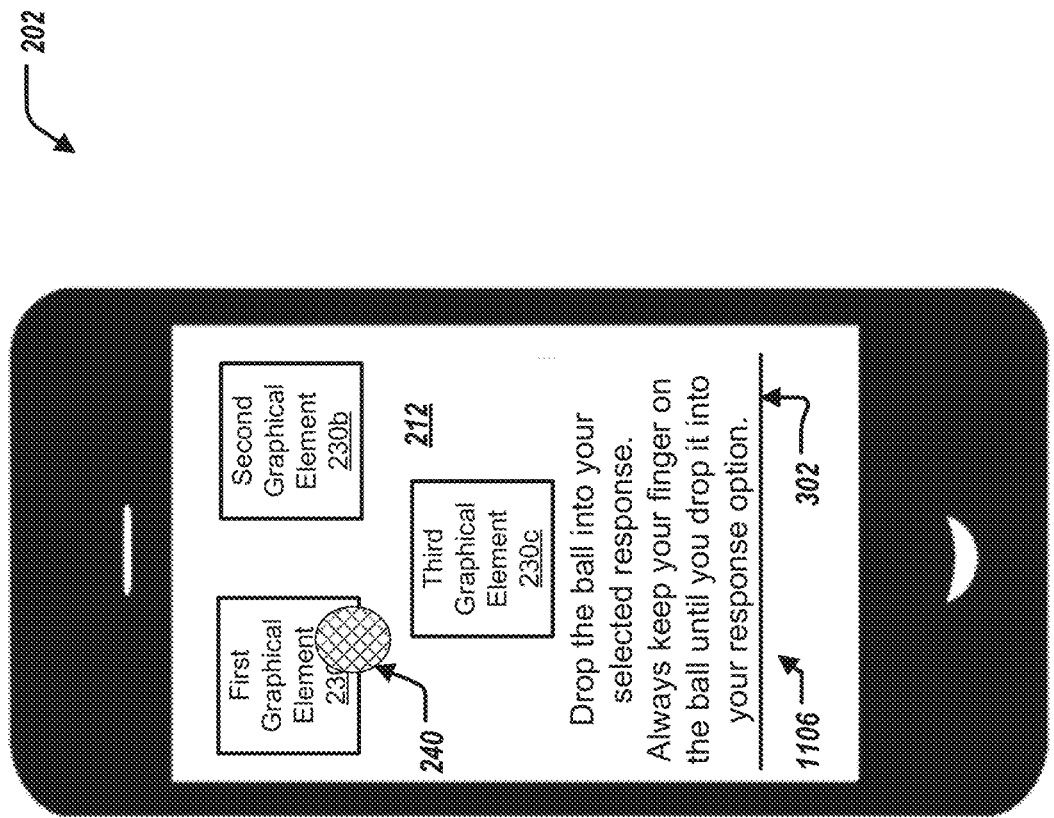

Referring to FIG. 11D, the touchscreen display 212 can display a fourth interface 1108 after providing the third interface 1106. For example, the fourth interface 1108 can include further text indicating instructions for the user 250 on how to provide touch based user input to facilitate performance of the input tracing at the mobile computing device 202. The fourth interface 1108 can further provide for display the first graphical element 230a at the first location, the second graphical element 230b at the second location, the third graphical element 230c, the user interactable interface element 240, and the segmentation indicator 302.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of performing input tracing, including:

providing, for display upon a touchscreen display of a mobile computing device, a first graphical element at a first position, a second graphical element at a second position, and a segmentation indicator, the first graphical element representing a first response and the second graphical element representing a second response;

providing, for display upon the touchscreen display of the mobile computing device, a user interactable element at an initial position;

providing, for display upon the touchscreen display of the mobile computing device, a third graphical element associated with the first response and/or the second response;

determining a target path between a center of the segmentation indicator and the first position of the first graphical element, the target path representing a straight-line path;

receiving touch-based user input from a user indicating a plurality of positions of the user interactable element with respect to the touchscreen display of the mobile computing device, including a final position of the user interactable element that coincides with the first position of the first graphical element;

updating, in response to the touch-based user input, display of the user interactable element upon the touchscreen display of the mobile computing device based on the plurality of positions;

tracking, based on the plurality of positions of the user interactable element with respect to the touchscreen display of the mobile computing device, an actual path of the user interactable element with respect to the first graphical element;

calculating a maximum deviation of the actual path from the target path;

comparing the maximum deviation to a threshold; and determining, based on the comparing, that the maximum deviation is greater than the threshold, and in response, storing data at a data store remote from the mobile computing device indicating a correlation between the user and the second response.

2. The computer-implemented method of claim 1, further comprising:

determining, based on the comparing, that the maximum deviation is less than the threshold, and in response, storing data at the data store indicating a correlation between the user and the first response.

3. The computer-implemented method of claim 1, wherein tracking the actual path of the user interactable element with respect to the first graphical element further includes determining, for each position of the user-interactable element with respect to the touchscreen display of the mobile computing device, coordinates of the user interactable element with respect to the touchscreen display of the mobile computing device.

4. The computer-implemented method of claim 3, wherein tracking the actual path of the user interactable element with respect to the first graphical element further includes calculating the actual path of the user interactable element with respect to the first graphical element based on the coordinates of the user-interactable element for each position of the user interactable element.

5. The computer-implemented method of claim 1, further comprising:
    determining a time period between the initial display of the third graphical element and the final position of the user interactable element; and
    storing data at the data store indicating the time period for the correlation between the user and the second response.

6. The computer-implemented method of claim 1, wherein providing, for display upon the touchscreen display of the mobile computing device, the third graphical element further includes providing, for display upon the touchscreen display of the mobile computing device, the third graphical element equidistant between the first graphical element and the second graphical element.

7. The computer-implemented method of claim 1, wherein the first graphical element, the second graphical element, the third graphical element, the segmentation indicator, and the user interactable element are displayed upon the touchscreen display in a landscape orientation of the touchscreen display.

8. The computer-implemented method of claim 1, wherein the first graphical element, the second graphical element, the third graphical element, the segmentation indicator, and the user interactable element are displayed upon the touchscreen display in a portrait orientation of the touchscreen display.

9. The computer-implemented method of claim 1, further comprising:
    adjusting a presentation of the first graphical element in response to the final position of the user interactable element coinciding with the first position of the first graphical element.

10. The computer-implemented method of claim 9, wherein adjusting the presentation of the first graphical element further includes adjusting a border of the first graphical element.

11. The computer-implemented method of claim 1,
    wherein providing, for display upon the touchscreen display of the mobile computing device, the user interactable element at the initial position further includes providing the user interactable element at the initial position and a first color,
    wherein updating the display of the user interactable element upon the touchscreen display of the mobile computing device further includes updating the user interactable element at the plurality of positions to a second color differing from the first color.

12. A computing device comprising a processor having access to memory media storing instructions executable by the processor to perform operations, comprising:
    providing, for display upon a touchscreen display of a mobile computing device, a first graphical element at a first position, a second graphical element at a second position, and a segmentation indicator, the first graphical element representing a first response and the second graphical element representing a second response;
    providing, for display upon the touchscreen display of the mobile computing device, a user interactable element at an initial position;
    providing, for display upon the touchscreen display of the mobile computing device, a third graphical element associated with the first response and/or the second response;
    determining a target path between a center of the segmentation indicator and the first position of the first graphical element, the target path representing a straight-line path;
    receiving touch-based user input from a user indicating a plurality of positions of the user interactable element with respect to the touchscreen display of the mobile computing device, including a final position of the user interactable element that coincides with the first position of the first graphical element;
    updating, in response to the touch-based user input, display of the user interactable element upon the touchscreen display of the mobile computing device based on the plurality of positions;
    tracking, based on the plurality of positions of the user interactable element with respect to the touchscreen display of the mobile computing device, an actual path of the user interactable element with respect to the first graphical element;
    calculating a maximum deviation of the actual path from the target path;
    comparing the maximum deviation to a threshold; and
    determining, based on the comparing, that the maximum deviation is greater than the threshold, and in response, storing data at a data store remote from the mobile computing device indicating a correlation between the user and the second response.

13. The computing device of claim 12, the operations further comprising:
    determining, based on the comparing, that the maximum deviation is less than the threshold, and in response, storing data at the data store indicating a correlation between the user and the first response.

14. The computing device of claim 12, wherein tracking the actual path of the user interactable element with respect to the first graphical element further includes determining, for each position of the user-interactable element with respect to the touchscreen display of the mobile computing device, coordinates of the user interactable element with respect to the touchscreen display of the mobile computing device.

15. The computing device of claim 14, wherein tracking the actual path of the user interactable element with respect to the first graphical element further includes calculating the actual path of the user interactable element with respect to the first graphical element based on the coordinates of the user-interactable element for each position of the user interactable element.

16. The computing device of claim 12, the operations further comprising:

determining a time period between the initial display of the third graphical element and the final position of the user interactable element; and storing data at the data store indicating the time period for the correlation between the user and the second response.

17. The computing device of claim 12, wherein providing, for display upon the touchscreen display of the mobile computing device, the third graphical element further includes providing, for display upon the touchscreen display of the mobile computing device, the third graphical element equidistant between the first graphical element and the second graphical element.

18. The computing device of claim 12, wherein the first graphical element, the second graphical element, the third graphical element, the segmentation indicator, and the user interactable element are displayed upon the touchscreen display in a landscape orientation of the touchscreen display.

19. The computing device of claim 12, wherein the first graphical element, the second graphical element, the third graphical element, the segmentation indicator, and the user interactable element are displayed upon the touchscreen display in a portrait orientation of the touchscreen display.

20. A non-transitory computer-readable medium storing software comprising instructions executable by one or more computers which, upon such execution, cause the one or more computers to perform operations comprising:

providing, for display upon a touchscreen display of a mobile computing device, a first graphical element at a first position, a second graphical element at a second position, and a segmentation indicator, the first graphical element representing a first response and the second graphical element representing a second response;

providing, for display upon the touchscreen display of the mobile computing device, a user interactable element at an initial position;

providing, for display upon the touchscreen display of the mobile computing device, a third graphical element associated with the first response and/or the second response;

determining a target path between a center of the segmentation indicator and the first position of the first graphical element, the target path representing a straight-line path;

receiving touch-based user input from a user indicating a plurality of positions of the user interactable element with respect to the touchscreen display of the mobile computing device, including a final position of the user interactable element that coincides with the first position of the first graphical element;

updating, in response to the touch-based user input, display of the user interactable element upon the touchscreen display of the mobile computing device based on the plurality of positions;

tracking, based on the plurality of positions of the user interactable element with respect to the touchscreen display of the mobile computing device, an actual path of the user interactable element with respect to the first graphical element;

calculating a maximum deviation of the actual path from the target path;

comparing the maximum deviation to a threshold; and determining, based on the comparing, that the maximum deviation is greater than the threshold, and in response, storing data at a data store remote from the mobile computing device indicating a correlation between the user and the second response.

* * * * *